(12) United States Patent
Damman et al.

(10) Patent No.: US 8,082,486 B1
(45) Date of Patent: Dec. 20, 2011

(54) SOURCE ATTRIBUTION OF EMBEDDED CONTENT

(75) Inventors: Xavier Damman, San Francisco, CA (US); Burt Herman, San Francisco, CA (US)

(73) Assignee: Storify, Inc., San Francisco, CA (US)

( * ) Notice: Subject to any disclaimer, the term of this patent is extended or adjusted under 35 U.S.C. 154(b) by 0 days.

(21) Appl. No.: 13/156,368

(22) Filed: Jun. 9, 2011

(51) Int. Cl.
*G06F 17/00* (2006.01)

(52) U.S. Cl. ........ 715/200; 715/201; 715/234; 715/209; 715/249; 715/273; 715/255; 726/2; 726/22; 726/26; 726/30; 726/31

(58) Field of Classification Search ............... 715/200, 715/201, 234, 209, 249, 273, 255; 726/2, 726/22, 26, 30–31
See application file for complete search history.

(56) References Cited

U.S. PATENT DOCUMENTS

| | | | |
|---|---|---|---|
| 6,330,670 B1 | 12/2001 | England et al. |
| 6,389,402 B1 | 5/2002 | Ginter et al. |
| 6,449,639 B1 | 9/2002 | Blumberg |
| 6,564,380 B1 | 5/2003 | Murphy |
| 6,937,266 B2 | 8/2005 | Rui et al. |
| 6,976,028 B2 | 12/2005 | Fenton et al. |
| 7,032,030 B1 | 4/2006 | Codignotto |
| 7,032,240 B1 | 4/2006 | Cronce et al. |
| 7,065,527 B2 | 6/2006 | McCartney et al. |
| 7,065,787 B2 | 6/2006 | Ganesan et al. |
| 7,113,301 B2 | 9/2006 | Su |
| 7,126,704 B2 | 10/2006 | Miura et al. |
| 7,155,451 B1 | 12/2006 | Torres |
| 7,254,836 B2 | 8/2007 | Alkove et al. |
| 7,349,005 B2 | 3/2008 | Rui et al. |
| 7,395,499 B2 | 7/2008 | Lane et al. |
| 7,418,403 B2 | 8/2008 | Reid et al. |
| 7,418,653 B1 | 8/2008 | Stern et al. |
| 7,577,999 B2 | 8/2009 | Narin et al. |
| 7,600,183 B2 | 10/2009 | Stern et al. |
| 7,631,318 B2 | 12/2009 | Cottrille et al. |
| 7,660,810 B2 | 2/2010 | Gautestad |
| 7,716,735 B2 | 5/2010 | Bellagamba et al. |
| 7,783,719 B2 | 8/2010 | Miller |
| 7,814,089 B1 | 10/2010 | Skretna et al. |
| 7,814,560 B2 | 10/2010 | Bellagamba et al. |

(Continued)

OTHER PUBLICATIONS

ContentRobot, "How to Use Bloglines to Subscribe to News Feeds", Mar. 7, 2006, ContentRobot, pp. 1-5.*

(Continued)

*Primary Examiner* — William Bashore
*Assistant Examiner* — David Faber
(74) *Attorney, Agent, or Firm* — Raj Abhyanker, P.C.

(57) ABSTRACT

A method, an apparatus and/or a system of source attribution of embedded content is disclosed. A source attribution system includes a tracking module configured to generate an identification meta-data to be associated with an original content of a first publisher that originates in a third-party source server of a public wide area network such that the original content is attributable to the first publisher through the identification meta-data associated thereto with the original content when the original content having the associated identification meta-data is republished. The system further includes a processor including a memory which is configured to determine that a subsequent publishing of the original content is an embedded portion of another work of authorship. The system also includes a notification module that notifies the first publisher upon subsequent publication of the original content by a subsequent publisher.

2 Claims, 18 Drawing Sheets

U.S. PATENT DOCUMENTS

| | | | |
|---|---|---|---|
| 7,827,298 B2 | 11/2010 | Black et al. | |
| 7,830,830 B2 | 11/2010 | Chan | |
| 7,840,176 B2 | 11/2010 | Chan | |
| 7,860,747 B2 | 12/2010 | Bryant | |
| 7,860,895 B1 | 12/2010 | Scofield et al. | |
| 7,861,155 B2 | 12/2010 | Yaung et al. | |
| 7,865,564 B2 | 1/2011 | Dennis | |
| 7,870,198 B2 | 1/2011 | Graham et al. | |
| 7,891,007 B2 | 2/2011 | Waxman et al. | |
| 7,908,602 B2 | 3/2011 | Alcorn et al. | |
| 7,917,848 B2 | 3/2011 | Harmon et al. | |
| 7,945,555 B2 | 5/2011 | Sankaran et al. | |
| 2002/0026327 A1* | 2/2002 | Kothari et al. | 705/1 |
| 2002/0116293 A1 | 8/2002 | Lao et al. | |
| 2004/0078754 A1 | 4/2004 | Son et al. | |
| 2004/0093558 A1 | 5/2004 | Weaver | |
| 2004/0128611 A1 | 7/2004 | Reid et al. | |
| 2005/0060166 A1* | 3/2005 | Durham et al. | 705/1 |
| 2006/0116926 A1 | 6/2006 | Chen | |
| 2006/0143307 A1 | 6/2006 | Codignotto | |
| 2006/0159366 A1 | 7/2006 | Darwish | |
| 2006/0218492 A1* | 9/2006 | Andrade | 715/523 |
| 2007/0050257 A1 | 3/2007 | Fine et al. | |
| 2007/0180523 A1* | 8/2007 | Jablonski et al. | 726/22 |
| 2007/0191040 A1* | 8/2007 | Kadar et al. | 455/466 |
| 2007/0270137 A1 | 11/2007 | Feng et al. | |
| 2007/0294306 A1 | 12/2007 | Toutonghi et al. | |
| 2008/0056574 A1 | 3/2008 | Heck | |
| 2008/0103906 A1 | 5/2008 | Singh | |
| 2008/0155080 A1* | 6/2008 | Marlow et al. | 709/223 |
| 2008/0183573 A1 | 7/2008 | Muschetto | |
| 2009/0044131 A1 | 2/2009 | Pylappan et al. | |
| 2009/0063377 A1 | 3/2009 | Brady et al. | |
| 2009/0106113 A1 | 4/2009 | Arora et al. | |
| 2009/0147780 A1 | 6/2009 | Guo et al. | |
| 2010/0042652 A1* | 2/2010 | O'Donnell | 707/104.1 |
| 2010/0153864 A1 | 6/2010 | Park et al. | |
| 2011/0016408 A1 | 1/2011 | Grosz et al. | |
| 2011/0023127 A1* | 1/2011 | O'Donnell et al. | 726/26 |
| 2011/0078017 A1 | 3/2011 | Lam et al. | |
| 2011/0082757 A1 | 4/2011 | Bullock | |

OTHER PUBLICATIONS

Google.com, "short messaging system—Google Search", Google, taken Oct. 6, 2011, 2 pages.*

* cited by examiner

| FIRST PUBLISHER 104 | ORIGINAL CONTENT 106 | SUBSEQUENT PUBLISHER 114 | ANOTHER WORK OF AUTHORSHIP 118 | LEVERAGED CONTENT 502 |
|---|---|---|---|---|
| JACK | TWITTER POST | JANE | YOUTUBE VIDEO AND TWITTER POST (JACK) | TWITTER POST + JACK |
| JOHN | FACEBOOK POST, TWITTER POST | JILL | FACEBOOK AND TWITTER POST (JOHN) AND YOUTUBE VIDEO | FACEBOOK AND TWITTER POST (JOHN) + JOHN |
| ADAM | YOUTUBE VIDEO | ASHLEY | WEB PAGE, ADAM'S YOUTUBE VIDEO, AND ASHLEY'S FACEBOOK POST | YOUTUBE VIDEO (ADAM'S) + ADAM |
| ASH | FACEBOOK POST | ALICE | TWITTER POST, ASH'S FACEBOOK POST + YOUTUBE VIDEO | ASH'S FACEBOOK POST + ASH |
| • • • | • • • | • • • | • • • | • • • |

TABLE VIEW 500

FIGURE 5

SOURCE ATTRIBUTION OF EMBEDDED CONTENT

FIELD OF TECHNOLOGY

This application relates generally to the use of a web-based technology to turn an online communication into an interactive dialogue, such as in a social media environment, and in one exemplary embodiment, to the source attribution of embedded content.

BACKGROUND

Publishing is the process of production and dissemination of literature or information the activity of making information available to the general public. In some cases, authors may be their own publishers, meaning: originators and developers of content who also deliver and display the content. Traditionally, publishing has often been done from the top of a mountain publishers would tell the public what they needed to know and the citizenry would just listen and absorb the information without much input. Today, much of the news has become a conversation, and publishers are required to listen to the community as they simultaneously broadcast to them. The voices in the community have always been there, but have been often lost at neighborhood meetings, forums, or just to a politically heated conversation at the dinner table.

Now, many of these conversations are taking place online, and publishers more than ever need to think from the beginning about what conversations need to take place as well as what platforms, online or otherwise, foster those conversations. A problem currently exists as publishing, as a participatory process, has not been available to the public at large. In the future, online publishing will manage and amplify the conversations the community is having, because the conversations will happen with or without popular access to traditional forms of publishing.

A source attribution system having a tracking module to generate an identification meta-data to be associated with an original content of a first publisher that originates in a third-party source server of a public wide area network will prove useful for all types of publishers. The original content created by an original publisher will be attributable to them through the identification meta-data associated with the original content when the original content having the associated identification meta-data is republished (by another publisher).

Currently, the challenge with the social stream as a means for news consumption is that it lacks context. A new approach to social media publishing must be able to enable a community to share stories that are attached to a time and a place and may showcase information on a timeline that intersects with people's stories. Publishers also need to have social content creation integrated into their workflow, whether that means creating content for specific platforms, or using the content from a particular platform for the purpose of curation. The challenge will lie in giving writers and producers specific tools they can use to pull disparate elements into stories from Facebook®, Twitter®, YouTube® etc.

Dramatic technological changes will open opportunities for online publishing to let anybody armed with a laptop and an internet connection to connect with the public (across the world) on an unprecedented level. While traditional publishing may still propound facts and supply the general public with the news, the rise of social media may change how a story is told and consumed. However, there is a lack of a platform for social media interaction-based publishing that is collaborative and at the same time naturally responsive to real time events and news. In addition, there is a need for a new tool that allows publishers to get instant feedback, gather meaningful tips, track trends and build valuable relationships with the public so increase the viability and profitability of online publishing.

Furthermore, although news organizations and online publishers have embraced social media, they have largely done so as a distribution channel, focusing on Facebook® and Twitter® because of the referral traffic that the platforms may provide to their sites. But as news and online publication outlets realize the value is not only measured in clicks, but in an engaged and participating audience, they will look to take advantage of other platforms, and perhaps more importantly, other online communities. Though many news organizations and publishing houses would like to engage readers across many social platforms, the missing link is often justifying such resources that are not always easy to monetize. It may be acceptable to deliver the news and original online content in a way that is targeted to social platforms, but what is currently lacking is a method to monetize news and original online content delivery using social platforms for more than just driving traffic back to news sites. What is lacking is a method to create real value—monetary and non-monetary, from online publishing.

SUMMARY

Disclosed is a system for the use of a web-based technology to turn an online communication into an interactive dialogue to promote online and citizen journalism, such as in a social media environment, and in one exemplary embodiment, to the source attribution of embedded content.

In one aspect, a source attribution system includes a tracking module configured to generate an identification meta-data to be associated with an original content of a first publisher that originates in a third-party source server of a public wide area network such that the original content is attributable to the first publisher through the identification meta-data associated thereto with the original content when the original content having the associated identification meta-data is republished. Further, the source attribution system includes a processor including a memory which is configured to determine that a subsequent publishing of the original content is an embedded portion of another work of authorship when a communication of the identification meta-data is extracted from a server in which the subsequent publishing is manifested and transmitted from the server to the processor. The source attribution system also includes a notification module to automatically generate a communication having one of an identity data of a subsequent publisher and a temporal data associated with the subsequent publishing that is transmitted to the first publisher of the original content when the another work of authorship is published with the embedded portion having the original content.

The source attribution may also include a transaction module to provide a financial incentive to the first publisher proportional to one of an aggregate number of views, unique visitor count, bounce rate, social sharing rate, and commenting rate, associated with subsequent publishing of the original content in the another work of authorship. The another work of authorship may be a separately copyrightable work of authorship including its own content in addition to leveraged and attributed content from disparate media sources.

The third-party source of the public wide area network may be a Short Messaging System (a.k.a. Short Messaging Service) based publication system that is monitored by the subsequent publisher through a leveraged content server in which the another work of authorship is compiled prior to publishing.

The leveraged content server may automatically format the another work of authorship to be optimally displayed in a plurality of multimedia format types including print, tablet format, video, online news, and blog format. Further, each embedded instance of the original content of the first publisher in the another works of authorship may be interact able directly through a location where the another work of authorship is published in a manner in which a click-through on the embedded portion of the another work of authorship transports a navigation pane presently including a particular republishing of the original content to the Short Messaging System based publication system in which the original content is first published by the first publisher.

The leveraged content server may automatically determine which original content is trusted in the public wide area network based on republishing history associated with the original content contributions of the first publisher and other first publishers. The leveraged content server may algorithmically present preferred content to subsequent publishers based on a criteria including a popularity of republishing of the original content and a credibility scoring of the first publisher and other publishers that is determined based on an algorithmic page rank of republished destinations and originated sources of the original content.

The determination based on the algorithmic page rank of republished destinations and originated sources of the original content may also consider a rating score assessed to original content and first publishers by subsequent publishers who provide this rating score of original content and first publishers in the leveraged content server such that all subsequent publishers have access privileges to access ratings and associated comments provided by peer subsequent publishers.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which:

FIG. 5 illustrates a table view, according to one or more embodiments.

Figure 1:
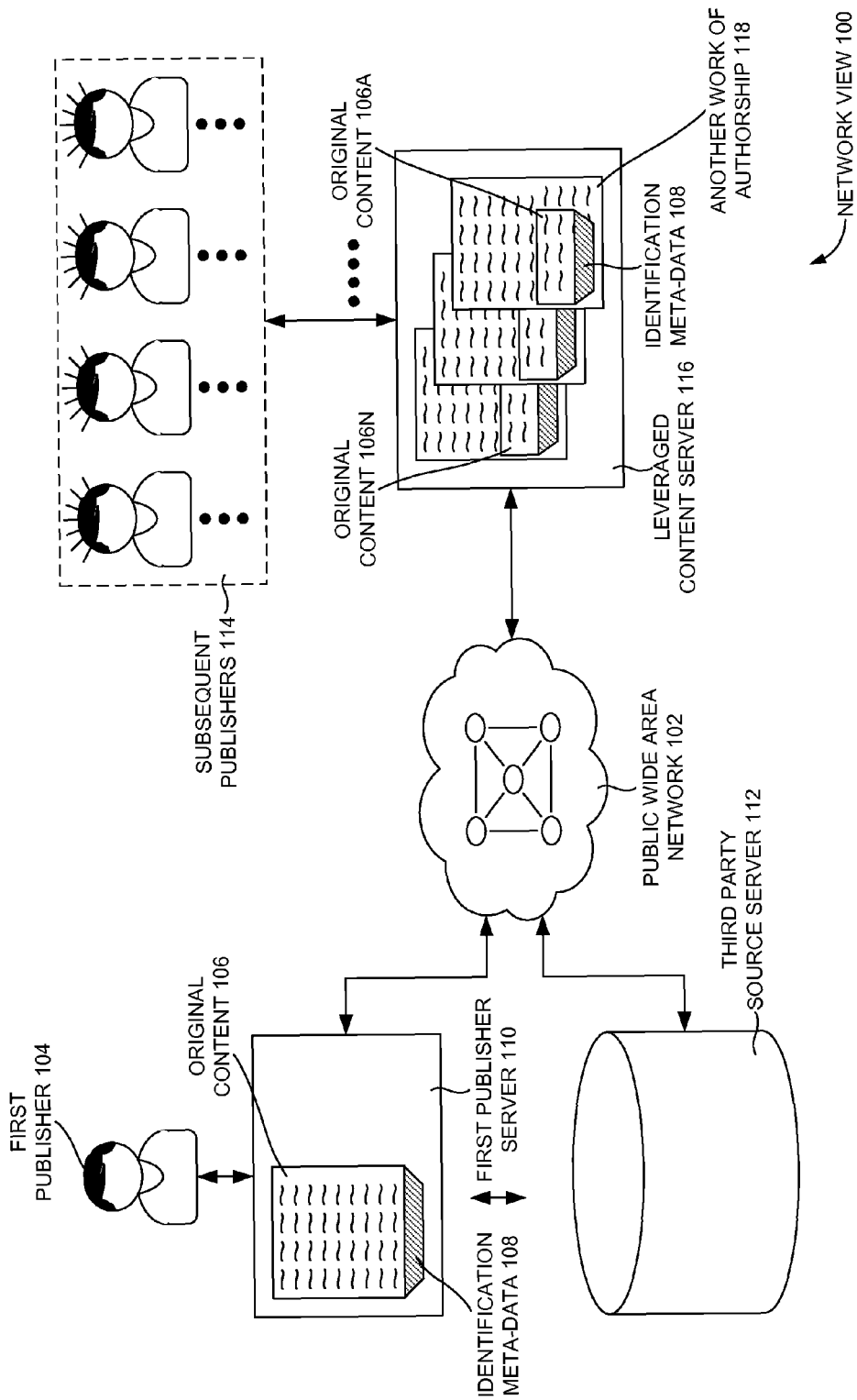
FIG. 1 is a schematic view of a public wide area network and a first publisher server according to one or more embodiments.

Other features of the present embodiments will be apparent from the accompanying drawings and from the detailed description.

DETAILED DESCRIPTION

Disclosed are a method, an apparatus and/or a system of source attribution of embedded content. Although the present embodiments have been described with reference to specific example embodiments, it will be evident that various modifications and changes may be made to these embodiments without departing from the broader spirit and scope of the various embodiments.

Online content and online publishing, as embodied in social media and social networking websites include a group of Internet-based applications that build on the ideological and technological foundations of Web 2.0, which allows for the creation and exchange of user-generated content. Businesses may refer to social media as consumer-generated media (CGM). A common thread running through all definitions of social media is a blending of technology and social interaction for the co-creation of value.

The social story interaction (the way web users engage content) is entering into the consciousness of editors and producers as they think through the outline of a story. It could very well be that we will see more stories that have deep social integration, especially for in-depth and crowd-sourced pieces. Taking social data and conversation and making sense of it will likely become more streamlined, and perhaps even more accessible to those besides major news organizations who have the resources to develop such packages.

Social media has a crucial role in the field of online publishing and Internet journalism. Social media may have been integral to the Arab revolutions and revolts of 2011. Activists on the ground in Egypt, Libya, and Iran have used Facebook® to schedule protests, Twitter® to coordinate protests, and YouTube® to tell the world about the protests (including live coverage of some events). Indeed, the uprising of 2009 in Iran was widely coordinated and published using social media websites such as Twitter® due to local government restrictions on mobile communications. It was during this time that the public at large, both in the West and in the Middle East, realized the vast potential of social media to make voices heard and opinions known, which otherwise would have been drowned or subdued due to government censorship or otherwise.

Traditionally, online publishing has been the practice of investigation and reporting of these events, issues, and trends to a broad audience. Although there is much variation within online publishing, the role of publisher has often been inaccessible to the masses. In modern society, news media has become the chief purveyor of information and opinion about public affairs; but the role and status of online publishing, along with other forms of mass media, are undergoing vast changes resulting from the Internet, especially Web 2.0. Therefore, it is no surprise that social media has an important role to play in the future of original content creation for online publishing thereby opening up the doors of online publishing to a wider audience.

Social media technologies provide scale and are capable of reaching a global audience. Social media tools are generally available to the public at little or no cost. Most social media production does not require specialized skills and training, or requires only modest reinterpretation of existing skills (as opposed to traditional print and news publications which may require formal training). In the case of social media based publishing, anyone with access can operate the means of social media production. In addition, social media can be altered almost instantaneously by comments or editing (as opposed to industrial media production).

Therefore, it is not surprising that social networking now accounts for 22% of all time spent online in the United States. A total of 234 million people age 13 or older in the United States used mobile devices in 2009. Twitter® processed more than one billion tweets in December 2009 and averages about 40 million tweets per day. Over 25% of United States internet page views occurred at one of the top social networking sites in December 2009, up from 13.8% a year before. The number of social media users age 65 and older grew 100% throughout 2010, so that one in four people in that age group are now part of a social networking website.

More importantly, social media tools are inspiring people and activists across the world to easily publish and share information on a greater scale (especially via online publishing). The future publisher may be more embedded with the community than ever before, and news outlets may build their newsrooms to focus on utilizing the community and may enable its members to be enrolled as certified publishers who create original content. Bloggers may no longer be just bloggers, but may be relied upon as more credible sources worthy of compensation.

Indeed, reporting has always been in some ways a collaborative process between journalists, publishers and their sources. However, social media based online publishing may permit a merger between the source and the content producer. As a result, there is potential for online publishing to take on a collaborative approach where the witness of the news becomes the creator of original content and its publisher. In essence, the community can be a source of the news as well as the audience, because social media makes them both. Social media may provide for a model of participatory publishing where there may be a potential for greater engagement and connection with the community, especially if traditional publishers are open to ceding a degree of editorial control to the community. A collaborative reporting environment may be created by enlisting a community of bloggers into the news gathering and production process.

FIG. 1 illustrates a network view according to one exemplary embodiment. The network view shows a leveraged content server 100, a first publisher server 102 and a third party source server 104. All three servers may communicate with a public wide area network 106. Also shown is an identification meta-data 108 which may originate within an original content 110, which in turn may reside within the first publisher server 102. The network view also illustrates an another work of authorship 112 which may be created entirely inside the leveraged content server 100. Similar to the first publisher server 102, the identification meta-data 108 may originate within an original content 110, which in turn may reside within the another work of authorship 112 (e.g., within the leveraged content server 100). The leveraged content server 100 may comprise an infinite number of another work of authorships 112 made up of corresponding original contents 110 and identification meta-data 108. In addition, the another work of authorship 112 may be entirely contained and created within the leveraged content server 100.

In another embodiment, the leveraged content server 100 may comprise several modules to implement specific methods and functions of the present invention. For example, according to one embodiment, the leveraged content server 100 may contain a leveraged content module 200, a publishing module 202, an authorship module 204, a tracking module 206, a processor module 208, a notification module 210, a generation module 212, a transaction module 214, and a page rank module 216. All aforementioned modules may communicate with each other independently and may also communicate collectively with the leveraged content module 200, according to one embodiment. The leveraged content module 200 may be thought of the brain of the leveraged content server 100, while all other modules may perform their respective tasks in association and conjunction with the leveraged content module 200.

According to one exemplary embodiment, FIG. 1 may show a first publisher 114 and subsequent publishers 116 in addition to the leveraged content server 100, the first publisher server 102 and the third party source server 104, including their contents (e.g., the identification meta-data 108, the original content 110, etc.). It may be appreciated that, at least according to one embodiment, the first publisher 114 may communicate with the first publisher server 102, and similarly, the subsequent publishers 116 may communicate with the leveraged content server 100. In the above mentioned embodiment, the first publisher 114 and the subsequent publishers 116 may be distinct entities or sources.

According to one embodiment, the leveraged content server 100 may be any computer server that may perform the functions and methods of the present invention. Particularly, the primary function of the leveraged content server 100 may be to recognize the original content 110 with its identification meta-data 108 (created in the first publisher server 102 by the first publisher 114) and embed the original content 110 (which carries a unique identification meta-data 108) in the another work of authorship 112 (created by the subsequent publisher 116). The leveraged content server 100 may communicate with the third party source server 104 and the first publisher server 102 through the public wide area network 106. In one embodiment, the leveraged content server 100 may embed the identification meta-data 108 identifying the original content 110 and the first publisher 114 into the another work of authorship 112.

The first publisher server 102 may be any computer server that may track, identify, and gather a plurality of original contents 110 created by a plurality of first publishers 114. According to this embodiment, the first publisher server 102 may communicate with the third party source server 104 to aggregate and collect a plurality of original content 110 from a plurality of first publishers 114. The first publisher server 102 may then assign a unique identification meta-data 108 to each original content 110. In one embodiment, the first publisher server 102 may communicate with the third party server 104 to gather and compile the original content 110.

The third party source server 104 may be a computer server that may store and transmit data that may be accessed via the Internet (e.g., the public wide area network 106). For example, any Internet social networking website may be a third party source server 104. A third party source server 104 may host a single or a plurality of Internet web sites (e.g., Facebook®, Twitter®, YouTube®, a blog site, a news site, a video site, etc.), or any other data resource that may be transmitted over the public wide area network 106, according to one embodiment. The third party source server 104 may also be the source for the original content 110, according to one embodiment. The source for the original content 110 may be a single or a plurality of Internet web sites, each Internet site being contained on a third party source server 104.

The leveraged content server 100, the first publisher server 102, and the third party source server 104 may all communicate with each other through the public wide area network 106 (e.g., the Internet). A public wide area network 106 may comprise several computer networks as well as specific servers (e.g., the third party source server 104) that may cover a broad area (i.e., may be any network or server whose communications may link and may cross metropolitan, regional, or national boundaries), according to one embodiment.

According to another exemplary embodiment, the original content 110 may contain an identification meta-data 108 which may identify the original content 110 as being created by the first publisher 114. The identification meta-data 108 may identify the first publisher 114 as the creator of the original content 110 on the third party source server 104 and available on the public wide area network 106, according to one embodiment. The identification meta-data 108 may contain structured hidden information that may describe a feature or a plurality of features of the original content 110 (e.g., the name of the creator of the original content 110, the time the original content 110 was created, the location where the original content 110 was created, the IP address from where the original content 110 was created etc.).

According to one embodiment, the identification meta-data 108 may be used to classify and identify specifics regarding the original content 110 (as identified in the examples above). Each piece of identification meta-data 108 may specify a property/value pair. The name attribute may identify the property and the content attribute may specify the property's value (for e.g., the name of the first publisher 114 of the original content 110 may be identified as a Facebook® user), according to one embodiment. According to another embodiment, the identification meta-data 108 may be stored in and retrieved from a database and may represent tags and titles that may be utilized within the source code of an Internet site (for e.g., Twitter® or Facebook®). The identification meta-data 108 may also provide descriptive information about the context, quality, condition, or characteristics of the underlying data (for e.g., of the original content 110), according to one embodiment. According to another embodiment, the identification meta-data 108 may also include attributes such as the date and time stamps associated with the original content 110.

According to an exemplary embodiment, an original content 110 may be created by a first publisher 114 and placed on a first publisher server 102 which may then be distributed over the public wide area network 106. The original content 110 may be a blog post (e.g., Wordpress®, Blogger® etc.), a post on a social networking website (e.g., Facebook®, Twitter®, etc.), a video post (e.g., YouTube®), or any other content that may be created by a user, or a plurality of users, to be shared across the public wide area network 106. The original content 110 may be created by the first publisher 114 and may contain an identification meta-data 108.

According to one embodiment, the original content 110 may be created entirely within the first publisher server 102. The original content 110 may also be a part of the another work of authorship 112 and may be embedded within the another work of authorship 112 inside the leveraged content server 100. According to one exemplary embodiment, the original content 110 may be an original work of authorship and may be attributed to the origination or creation of a particular unit of information (for e.g., a blog post) to a specific individual (for e.g., the first publisher 114) or entity acting at a particular time. The original content 110 may be protected by copyright laws which may provide the creator of the original content 110 with an exclusive set of rights, including the right to copy, distribute, or adapt the original content 110.

Similarly, the another work of authorship 112 may also be protected by copyright laws which may provide the creator of the another work of authorship 112 with an exclusive set of rights, including the right to copy, distribute, or adapt the another work of authorship 112. According to an exemplary embodiment, the another work of authorship 112 may be created by a subsequent publisher 116 and may be created and compiled in a leveraged content server 100. The another work of authorship 112 may be embedded with an original content 110, which in turn may contain an identification meta-data 108. According to one embodiment, the another work of authorship 112 may comprise a plurality of textual, audio, video, or pictorial components (e.g., a Facebook® post, a blog post, a YouTube® video, an audio file, or a picture). In addition, the another work of authorship 112 may be created and published by a subsequent publisher 114.

The original content 110 may be created by a first publisher 114 and the another work of authorship 112 may be created by a subsequent publisher 116. According to one embodiment, the first publisher 114 may be the user of any data related service or Internet website (e.g., Facebook®, Twitter®, YouTube®, a blog site, a news site, a video site, etc.) hosted on the third party source server 104 and transmitted over the public wide area network 106. For example, the first publisher 114 may be a Twitter® or Facebook® user who may post a message, a tweet, or a status update. This action by the first publisher 114 may be recorded on the third party source server 104 as the original content 110 (e.g., the Twitter® server or the Facebook® server) and may be available to the subsequent publisher 116 through the public wide area network 106 (e.g., the Internet).

The subsequent publisher 116 may then decide to incorporate the original content 110 of the first publisher 114 into the another work of authorship 112, at least according to one exemplary embodiment. Another embodiment may involve the subsequent publisher 116 who may publish the another work of authorship 112 which may contain the original content 110 created by the first publisher 114. The subsequent publisher 116, like the first publisher 114, may be a user of any data related service or internet website (e.g., Facebook®, Twitter®, YouTube®, a blog site, a news site, a video site, etc.). In another embodiment, the subsequent publisher 116 may be the creator of the another work of authorship 112 who may incorporate the original content 110 created by the first publisher 104 and found on the third party source server 104 into the another work of authorship 112. This incorporation and compiling may occur inside the leveraged content server 100. The another work of authorship 112 may be accessible on the public wide area network 106, according to one embodiment.

Figure 2:
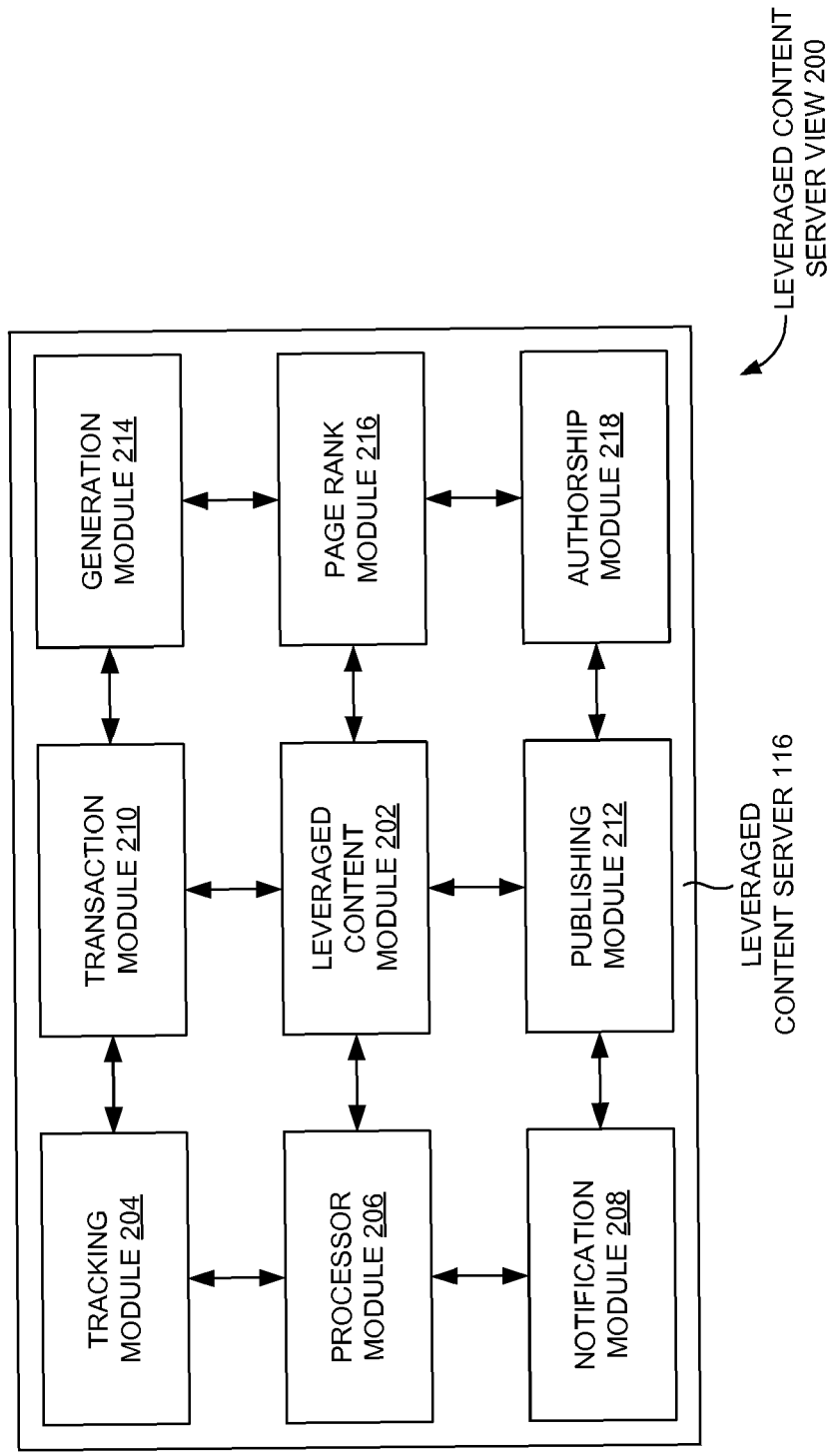
FIG. 2 is a schematic view of modules inside a leveraged content server, according to one or more embodiments.

As mentioned above, and according to one exemplary embodiment, the leveraged content server 100 may comprise several modules to implement specific methods and functions of the present invention. FIG. 2 illustrates the functioning of specific modules inside the leveraged content server 100 to accomplish the creation of the another work of authorship 112 in addition to other functions which will be described in detail below. All referenced modules within the leveraged content server 100 may be interconnected in order to compile and publish the another work of authorship 112, among other functions (e.g., notifying the first publisher 114 upon publication of the another work of authorship 112).

The functions performed by the leveraged content server 100 as identified above may be performed by several modules contained within the leveraged content server 100. For example, the leveraged content server may contain a leveraged content module 200 which may recognize the original content 110 with its identification meta-data 108 (created in the first publisher server 102 by the first publisher 114) and may then embed the original content 110 (which carries a unique identification meta-data 108) in the another work of authorship 112 (created by the subsequent publisher 116). The leveraged content module 200 may communicate with the publishing module 202 and the authorship module to permit the subsequent publishers 116 to publish the another work of authorship 112, according to one embodiment. In another embodiment, the leveraged content module 200 may embed the original content 110 with its corresponding identification meta-data 108 identifying the first publisher 114 into the another work of authorship 112.

According to one embodiment, the leveraged content module 200 may measure, at any given time, the ability of a subsequent publisher 116 to use the original content 110 created by a first publisher 114 to create and publish an another work of authorship 112. The leveraged content module 200 may also communicate with all other referenced modules to perform the functions and methods of the present invention, according to one embodiment. In one particular embodiment, the leveraged content module 210 may permit all subsequent publishers to have access privileges to the rating score and comments assessed to the original content 106 and the first publisher 104 by a subsequent publisher 114. The leveraged content module 200 may also automatically format the another work of authorship 112 to be optimally displayed in a plurality of multimedia formats (e.g., print, video, news, blog, etc.) according to one exemplary embodiment. In another embodiment, the leveraged content module 200 may permit the subsequent publisher 116 to monitor the another work of authorship 112 on the public wide area network 106 upon subsequent publication.

Another important aspect of the leveraged content server 100 may be the publishing module 202. The publishing module 202 may publish the another work of authorship 112 such that the another work of authorship 112 may be accessible over the public wide area network 106. The publishing module 202 may also determine the publisher of the original content 110 to be the first publisher 114. Similarly, the publishing module 202 may also determine the publisher of the another work of authorship 112 to be the subsequent publisher 116. According to one exemplary embodiment, the publishing module 202 may facilitate the process of production and dissemination of the another work of authorship 112 and make it available for public view over the public wide area network 106.

The publishing module 202 may communicate with the authorship module 204 such that the authorship module 204 may determine the creator of both the original content 110 and the another work of authorship 112. The authorship module 204 may determine the author of the original content 110 to be the first publisher 114 and the author of the another work of authorship to be the subsequent publisher 116. The authorship module 204 may make a determination of the distinct entities or persons who may comprise the first publisher 114 and the subsequent publishers 116. In one embodiment, the authorship module 204 may designate a first publisher 114 and a subsequent publisher 116 as a person who originates or gives existence to an original content 110 and an another work of authorship 112 respectively.

The authorship module 204 may also attribute the origination or creation of an original content 110 and an another work of authorship 112 to a specific individual or entity acting at a particular time. In another embodiment, the authorship module 204 may assign responsibility and may give credit for an intellectual work (for e.g., an original content 110 or an another work of authorship 112). Such recognition provided by the authorship module 204 may be critical for the reputation and integrity of the creator (for e.g., a first publisher 114 or a subsequent publisher 116) of an original work of authorship (for e.g., an original content 110 or an another work of authorship 112), according to one exemplary embodiment.

The leveraged content server 100 may also include a tracking module 206 that may generate an identification meta-data 108 to be associated with an original content 110 of a first publisher 114 that may originate in a third-party source server 104 of a public wide area network 106, according to one embodiment. In another embodiment, the tracking module 206 may attribute the original content 110 to the first publisher 114 through the identification meta-data 108. The tracking module 206 may also determine the authorship source of the original content 110 and the another work of authorship 112, in addition to other data related to the original content 110 and the another work of authorship 112 such as time of creation and place of creation.

The tracking module 208 may communicate with a processor module 208 within the leveraged content server 100. According to an exemplary embodiment, the processor module 208 may determine that a subsequent publishing by a subsequent publisher 116 of the original content 110 may be an embedded portion of the another work of authorship 112. According to one embodiment, this determination may happen when a communication of the identification meta-data 108 may be extracted from the leveraged content server 100 in which the subsequent publishing maybe manifested and transmitted from the leveraged content server 100 to the processor module 208.

Another important aspect of the leveraged content server 100 may be a notification module 210. The processor module 208 may communicate with the notification module 210. According to one embodiment, the notification module 210 may generate a communication having an identity data of a subsequent publisher 116 and a temporal data (e.g., a data that may explicitly refer to the time of creation or publication of the another work of authorship 112 or a data that may be linked to a certain time or period between two moments in time when the another work of authorship 112 may have been created) associated with the subsequent publishing of the another work of authorship 112. The notification module 210 may then transmit this communication to the first publisher 114 of the original content 110 when the another work of authorship 112 is published with the embedded portion having the original content 110.

In yet another embodiment, the notification module 210 may be dependent on a generation module 212 to generate an identification meta-data 108 to be associated with an original content 110 of a first publisher 114 and to generate a communication having an identity data of a subsequent publisher 116 that may be transmitted to the first publisher 114. The generation module 212 may generate all necessary data needed by the notification module 210 in addition to the identification meta-data 108, according to one embodiment.

The leveraged content server 100 may also contain a transaction module 214 that may provide a financial incentive to the first publisher 114 depending on the aggregate number of page views associated with the subsequent publishing of the original content 110 in the another work of authorship 112. The transaction module 214 may facilitate financial transactions between a subsequent publisher 116 and a first publisher 114 (for e.g., if the subsequent publisher 116 wishes to monetize the another work of authorship 112 which contains the original content 110 created by the first publisher 114). The creator of the another work of authorship 112 (e.g., a subsequent publisher 116) may be given the option to purchase the copyrighted work (e.g., the original content 110) created by the first publisher 114 so that the subsequent publisher 116 may copy, adapt, or transform the original work of authorship (e.g., the original content 110) created by the first publisher 114.

Closely related to the transaction module 214 may be a page rank module 216. According to one embodiment, the page rank module 216 may determine an algorithm-based page rank of the another work of authorship 112 based on a rating score assessed to the original content 110 and the first publisher 114 by the subsequent publisher 116. The financial incentive to the first publisher 114 may also depend on the rating score assessed by subsequent publishers 116 to the original content 110 created by the first publisher 114. The page rank module 216 may assign a numerical weight to each piece of an original content 110 within the another work of authorship 112 with the purpose of measuring its relative importance within the another work of authorship 112 (compared to other pieces of original content created by other first publishers). The rating score assessed to an original content 110 may be determined by measuring both the quality and quantity of individual pieces of content (created and published by a first publisher 114 or several first publishers) that qualify as an original content 110 and that may be embedded in the another work of authorship 112 (by subsequent publishers 116).

Figure 3:
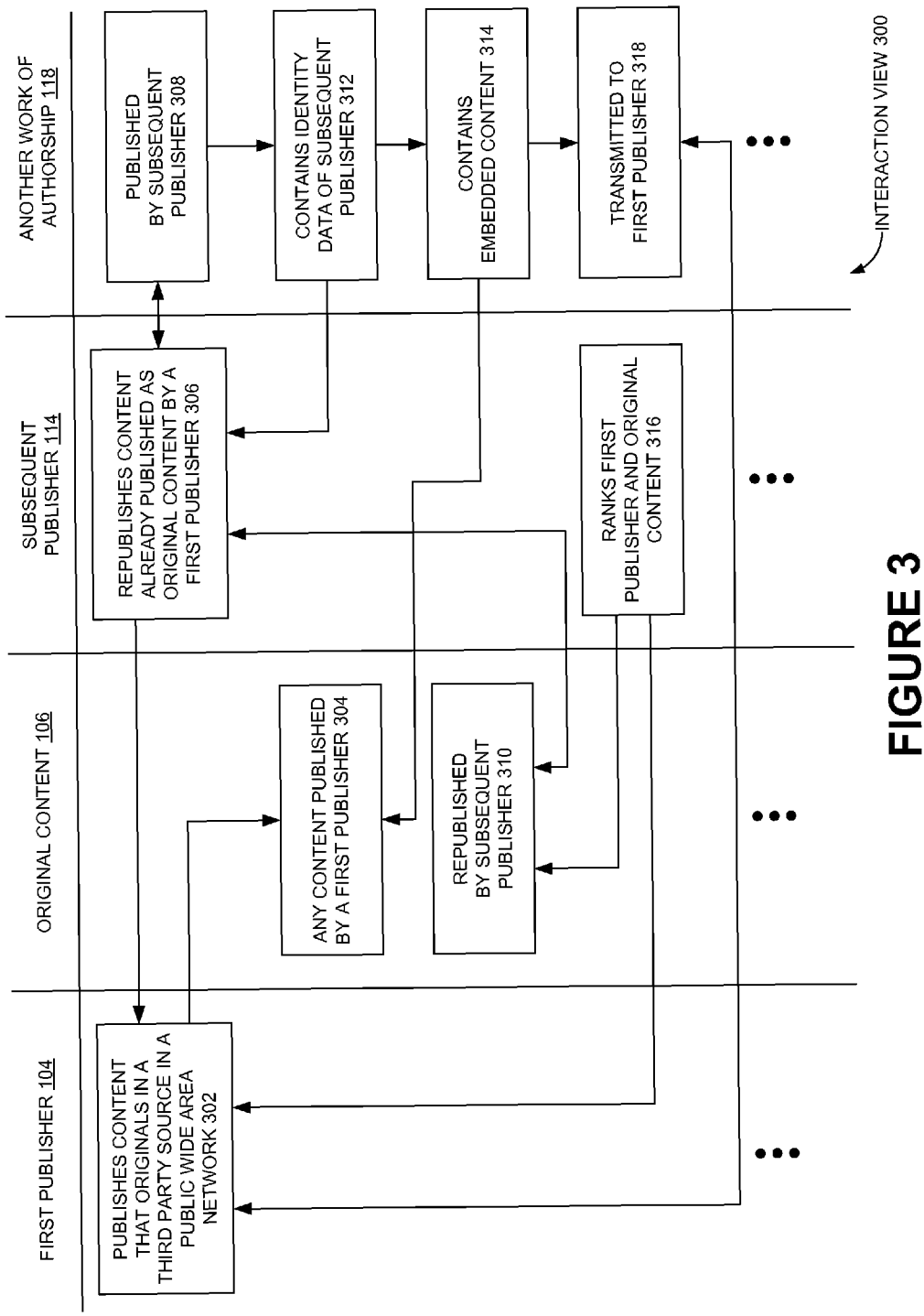
FIG. 3 illustrates an interaction view of the publisher, original content, subsequent publisher and another work of authorship, according to one or more embodiments.

FIG. 3 illustrates an interaction view 300 according to one exemplary embodiment. A first publisher 114 may publish content that may originate in a third party source server 104 in a public wide area network 106. An original content 110 may be any content (e.g., any online content created on a social networking website or other website) that may be created and published by a first publisher 114. The original content 110 may also be republished by subsequent publishers 116 and the subsequent publisher 116 may republish content already published as the original content 110 by the first publisher 114, according to one embodiment.

According to another embodiment, the subsequent publisher 116 may also rank the first publisher 114 and the original content 110. In one embodiment, the another work of authorship 112 may be published by a subsequent publisher 116 and may contain the identity data of the subsequent publisher 116 as well as the first publisher 114. In this embodiment, the another work of authorship 112 may contain embedded content from disparate online (e.g., Internet) sources and may transmit a temporal data associated with the subsequent publishing to the first publisher 114 of the original content 110 when the another work of authorship 112 is published with the embedded portion having the original content 110.

Figure 4:
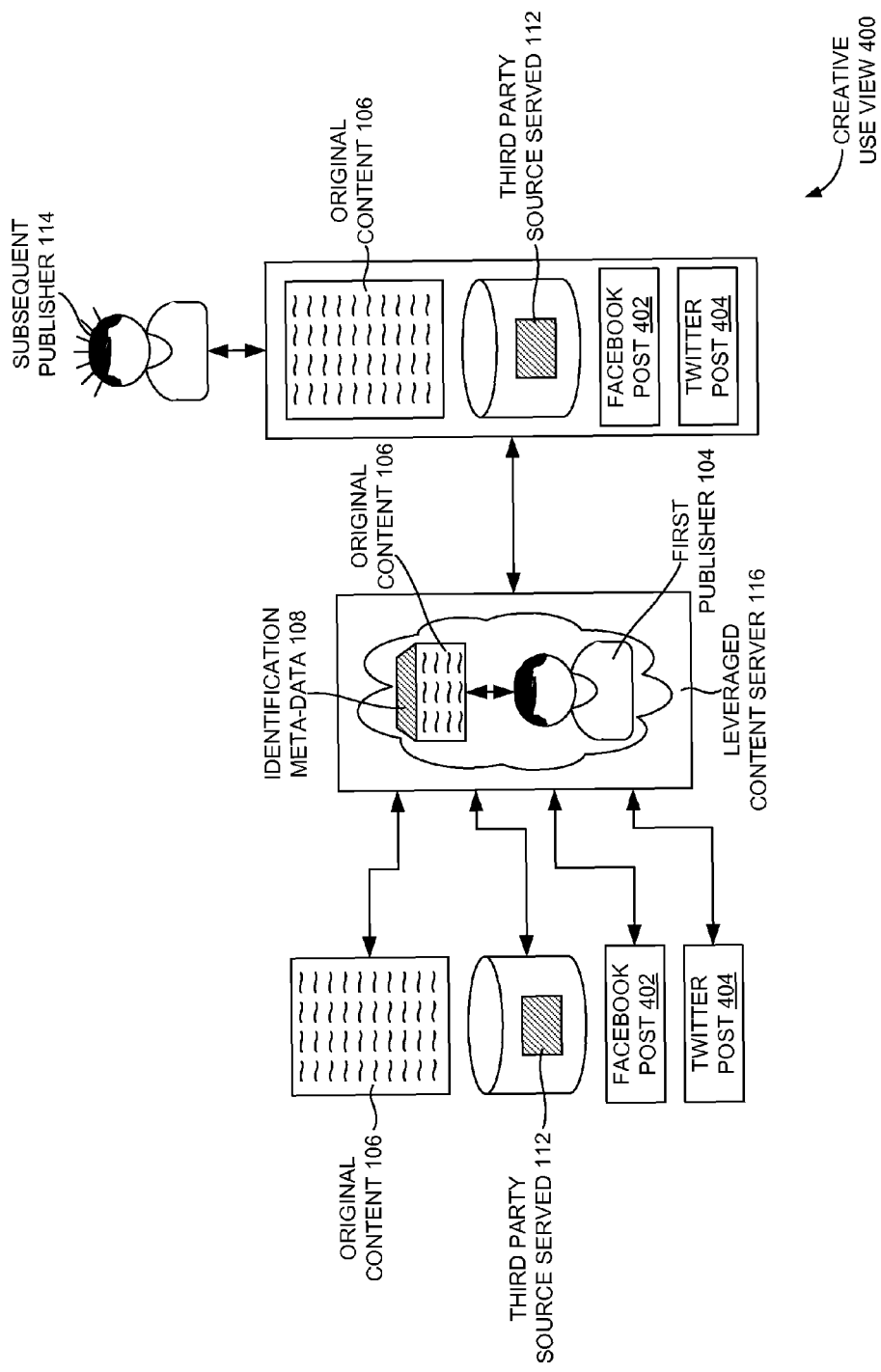
FIG. 4 illustrates a creative use view, according to one or more embodiments.

FIG. 4 illustrates a creative use view 400 according to one exemplary embodiment. An original content 110 may be found in a third party source server 104 which may in turn be a Facebook® post 402 or a Twitter® post 404, each containing its own identification meta-data 108, which may specifically identify the creator as the first publisher 114. The leveraged content server 100 may compile the original content 110 (for e.g., the Facebook® post 402 or the Twitter® post 404) and associate it with the first publisher 114 via the identification meta-data 108 associated with the Facebook® post 402 or the Twitter® post 404. A subsequent publisher 116 may then republish the original content 110 (for e.g., the Facebook® post 402 or the Twitter® post 404) found in the third party server 104 using the leveraged content server 100, according to one exemplary embodiment.

According to another embodiment, a transaction module may provide a financial incentive to the first publisher 114 proportional to at least one of an aggregate number of views, unique visitor count, bounce rate, social sharing date, and commenting rate associated with the subsequent publishing of the original content 110 in the another work of authorship 112. In this embodiment, the another work of authorship 112 may be separately copyrightable comprising its own content (created by the subsequent publisher 116) in addition to leveraged and attributed content from disparate media sources (e.g., from any social networking website on the Internet).

FIG. 5 illustrates a table view 500 according to one embodiment. The first publisher 114 may be either Jack, John, Adam, Ash etc. The original content 110 published by Jack may be a Twitter® post. The original content 110 published by John may be a Facebook® and a Twitter® post. The original content 110 published by Adam may be a YouTube® video and the original content produced by Ash may be a Facebook® post. The subsequent publisher 116 may be Jane, Jill, Ashley, Alice, etc. and would correspond to the first publisher 114 being Jack, John, Adam, Ash etc. respectively. The another work of authorship 112 republished by Jane may be a YouTube® video and a Twitter® post wherein the leveraged content 502 may be the Twitter® post published by Jack, according to one embodiment. The another work of authorship 502 republished by Jill may be a Facebook® post and a Twitter® post published by John in addition to a YouTube® video wherein the leveraged content 502 may be the Facebook® post and the Twitter® post published by John, according to another embodiment.

Similarly, the another work of authorship 112 republished by Ashley may be a web page, a Facebook® post and Adam's YouTube® video wherein the leveraged content 502 may be Adam's YouTube® video along with Adam's identity provided by the identification meta-data 108 included in Adam's YouTube® video. Finally, the another work of authorship republished by Alice may include a Twitter® post and a YouTube® video including Ash's Facebook® post wherein the leveraged content 502 may be Ash's Facebook® post along with Ash's identity and geographical location provided by the identification meta-data 108 included in Ash's YouTube® video, according to one embodiment.

Figure 7:
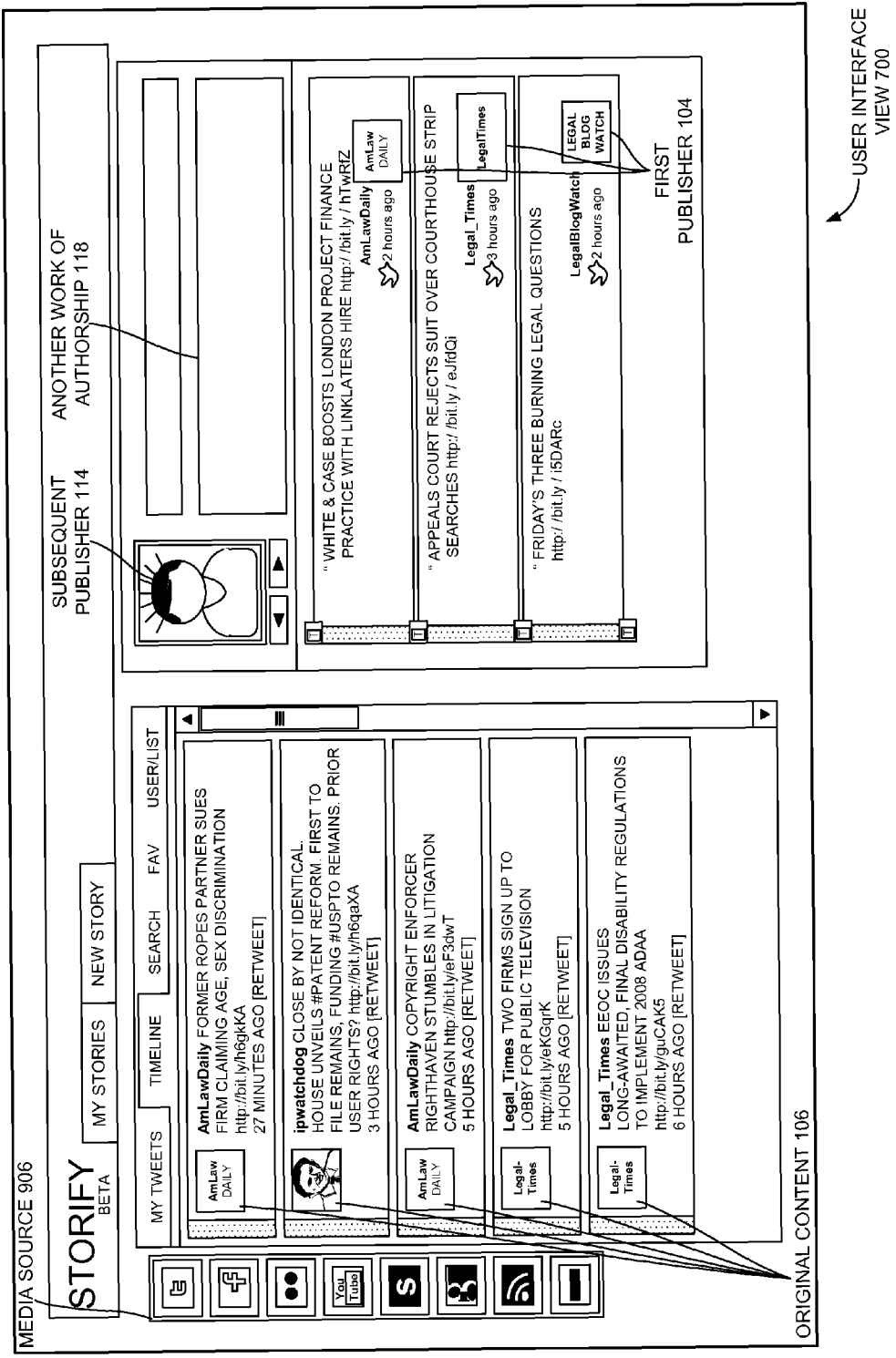
FIG. 7 illustrates a user interface view of the present invention, according to one or more embodiments.

FIG. 7 illustrates a user interface view 700 according to one embodiment. The original content 110 may be derived from a disparate media source, such as media source 702 (e.g., Twitter®, Facebook®, YouTube®, etc.). The subsequent publisher 116 may then republish the original content 110 in the another work of authorship 112 by using content already published by the first publisher 114, according to one embodiment. This operation may take place inside the leveraged content server 100. The subsequent publisher 116 may also have the freedom to pick and choose which original content 110 from which first publisher 114 he/she may want to republish in the another work of authorship 112, according to one exemplary embodiment.

In yet another embodiment, the third party source server 104 of the public wide area network 106 may be a Short Messaging System 1102 (SMS) based publication system that may be monitored by the subsequent publisher 116 through a leveraged content management server (e.g., the leveraged content server 100) in which the another work of authorship 112 may be complied prior to publishing (e.g., republishing by the subsequent publisher 116 as the another work of authorship 112).

Figure 8A:
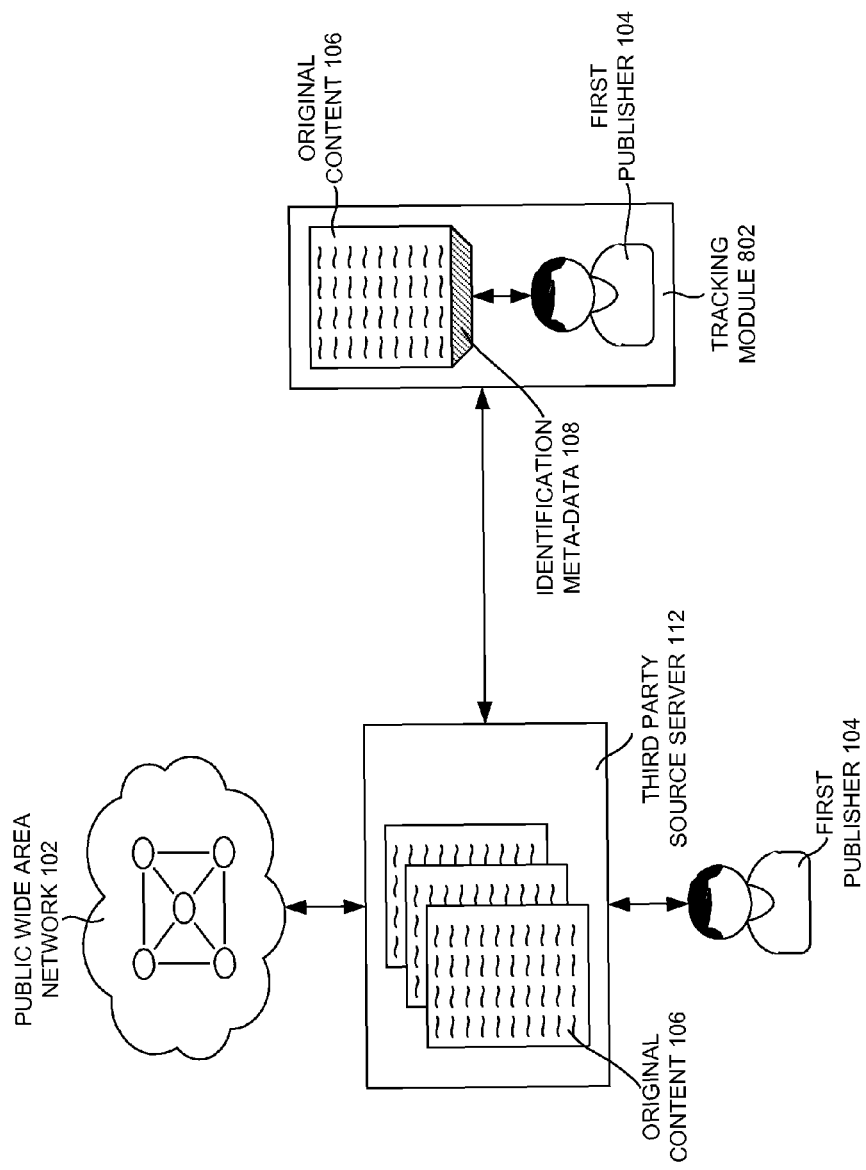
FIG. 8A is a schematic view of a tracking module, according to one or more embodiments.

FIG. 8A illustrates a tracking module 206 according to one embodiment. The original content 110 may be found in the third party server 104 and may be published by a first publisher 114. The third party source server 104 may a part of the public wide area network 106. The tracking module 206 may embed the identification meta-data 108 in the original content 110 to identify and track the original content 110 to the first publisher 114, according to one embodiment.

Figure 8B:
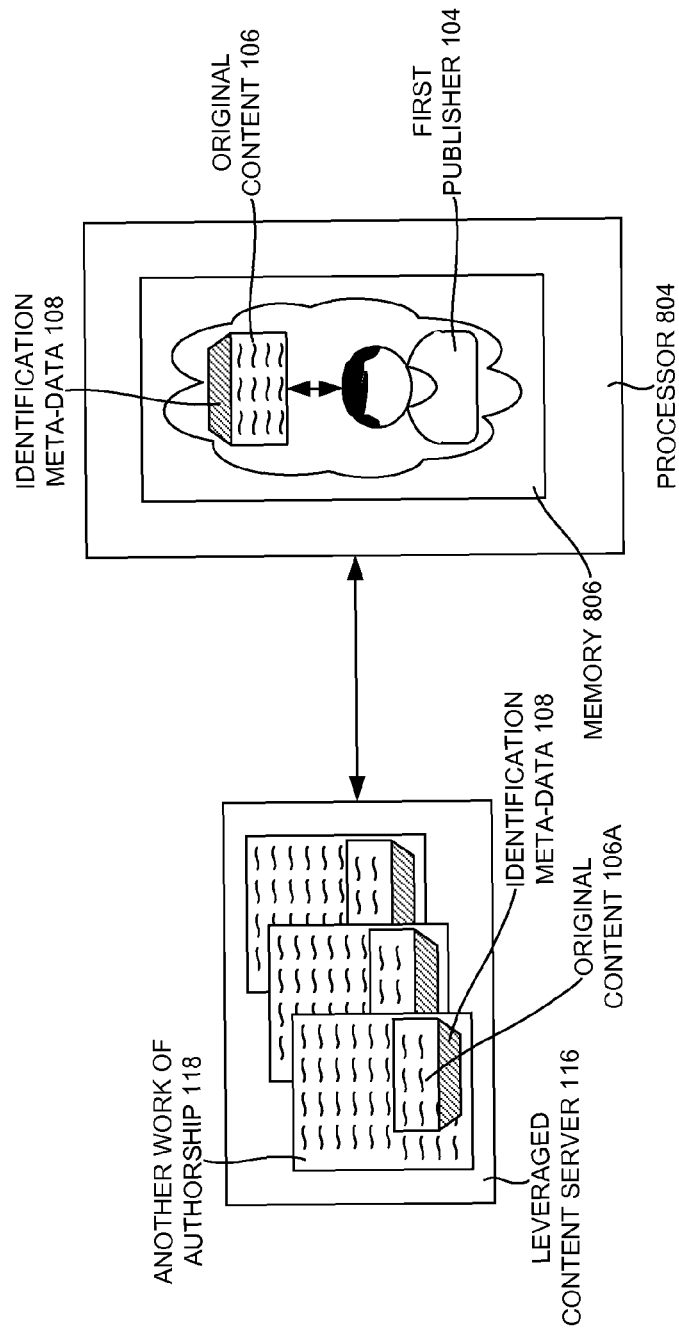
FIG. 8B is a schematic view of the interaction between the tracking module and a processor, according to one or more embodiments.

FIG. 8B illustrates the interaction between the tracking module 208 and a processor 804. According to an exemplary embodiment, a processor 804 may determine that a subsequent publishing as an another work of authorship 112 of the original content 110 may be an embedded portion of the another work of authorship 112. In this embodiment, the leveraged content server 100 may compile the original content 110 along with the identification meta-data 108 and incorporate both into the another work of authorship 112. According to another exemplary embodiment, the processor 804 and a memory 806 may determine that the original content 110 may be published by the first publisher 114 by utilizing the identification meta-data 108 associated with the original content 110. It may be appreciated that the processor 804 of FIG. 8B may be the same or similar to the processor 602 of FIG. 6 and may perform substantially the same functions.

Figure 8C:
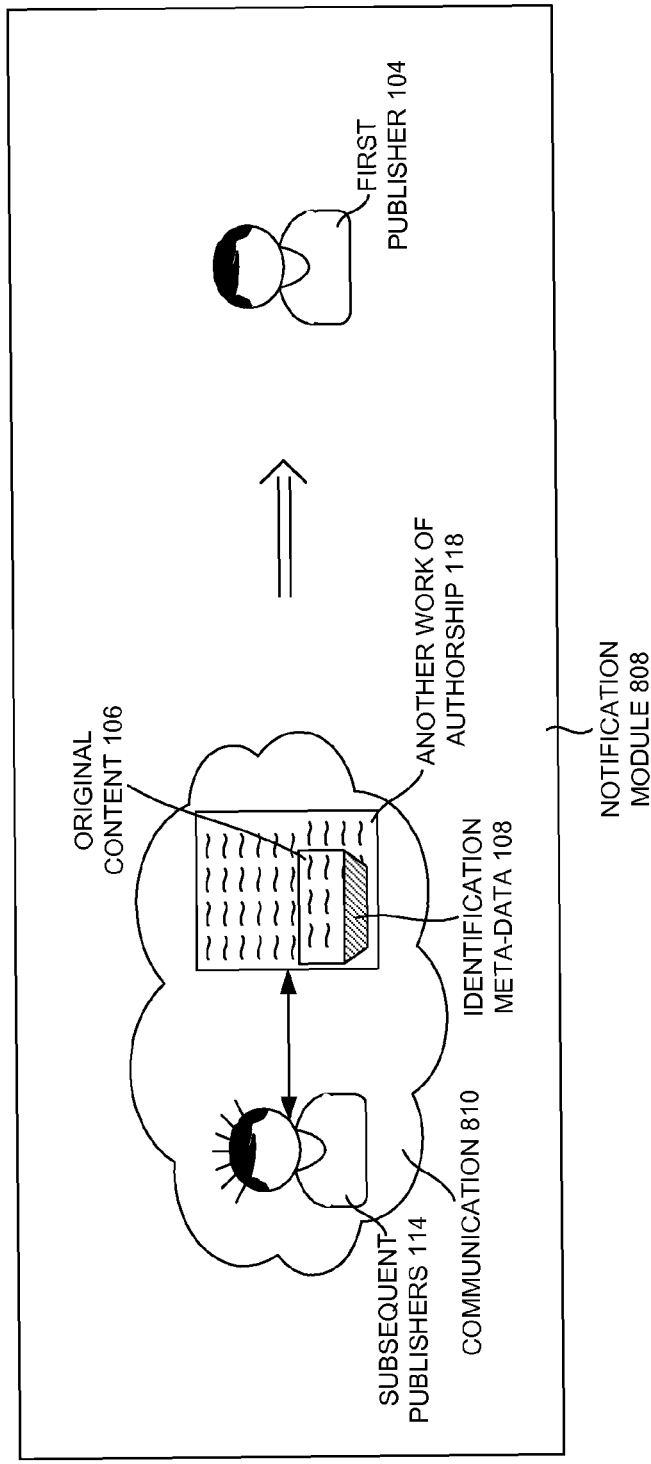
FIG. 8C is a schematic view of a notification module, according to one or more embodiment.

FIG. 8C illustrates the notification module 210 according to one exemplary embodiment. The processor module 208 may communicate with the notification module 210. According to one embodiment, the notification module 210 may generate a communication 810 having an identity data of a subsequent publisher 116 associated with the subsequent publishing of the another work of authorship 112 having the original content 110 (associable to the first publisher 114 by the identification meta-data 108). The notification module 210 may then transmit this communication to the first publisher 114 of the original content 110 when the another work of authorship 112 is published with the embedded portion having the original content 110. The communication may comprise the republishing data associated with the republishing of the original content 110 (such as the location of republishing, date of republishing, time of republishing, etc.), according to one embodiment.

According to another exemplary embodiment, the leveraged content management portal (e.g., the leveraged content server 100), may automatically format the another work of authorship 112 to be optimally displayed in a plurality of multimedia types including print (e.g., for a newspaper), tablet (e.g., for the iPad®), video (e.g., for YouTube®), online news (e.g., for The New York Times® reader), and blog (e.g., for Blogger®, Tumblr®, Posterous®, etc.). In this embodiment, each embedded instance of the original content 110 of the first publisher 114 in the another work of authorship 112 may be directly intractable through a location where the another work of authorship 112 may be published in a manner in which a click-through on the embedded portion of the another work of authorship 112 may transport a navigation pane 1210 presently comprising a particular republishing of the original content 110 to the Short Messaging System 1102 (SMS) based publication system in which the original content 110 may be first published by the first publisher 114.

Figure 9A:
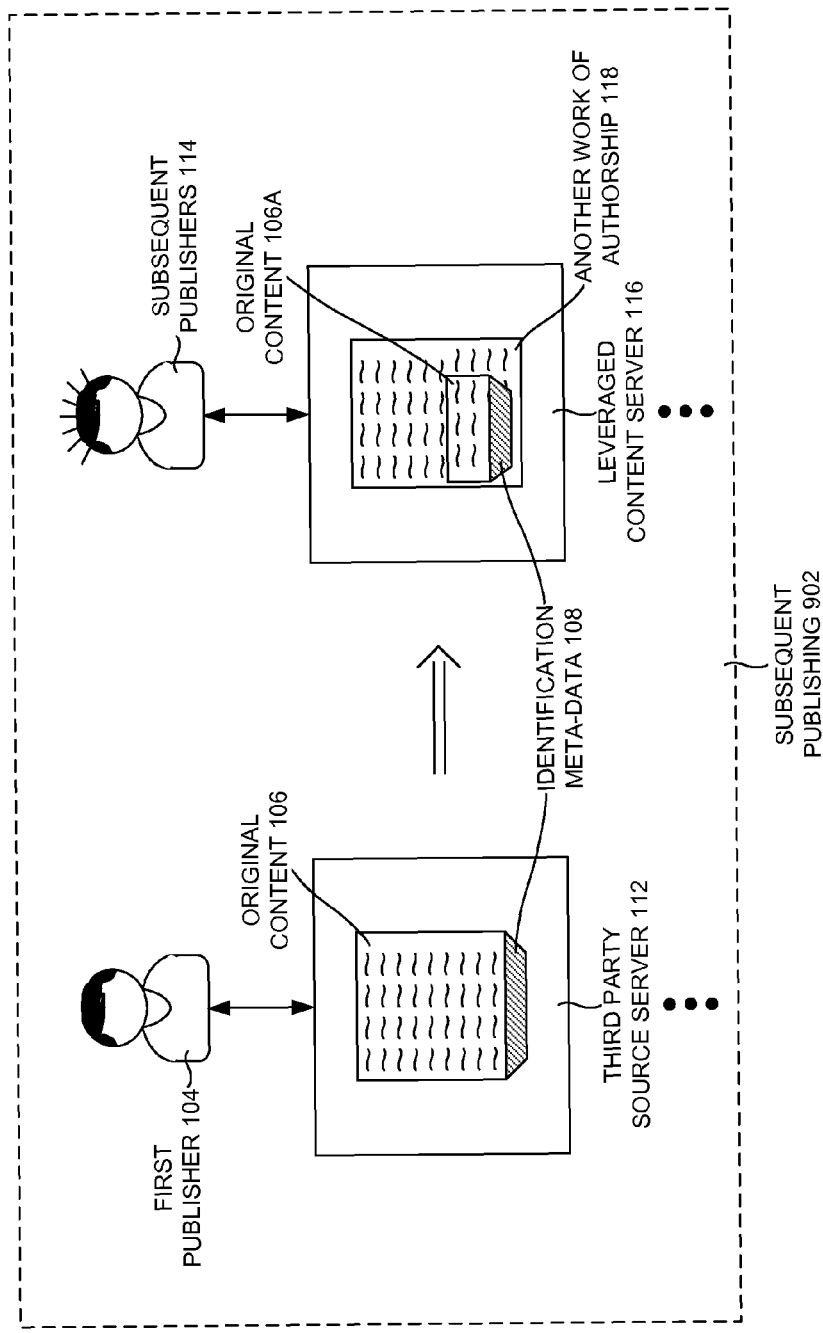
FIG. 9A is a schematic view of the subsequent publishing of the original content, according to one or more embodiments.

FIG. 9A illustrates the subsequent publishing 902 of the original content 110, according to one embodiment. A first publisher 114 may create and publish an original content 110 in a third party source server 104. An identification meta-data 108 may be associate the first publisher 114 with the original content 110. A subsequent publisher 116 may then republish a part or all of the original content 110 in an another work of authorship 112 in the leveraged content server 100.

Figure 9B:
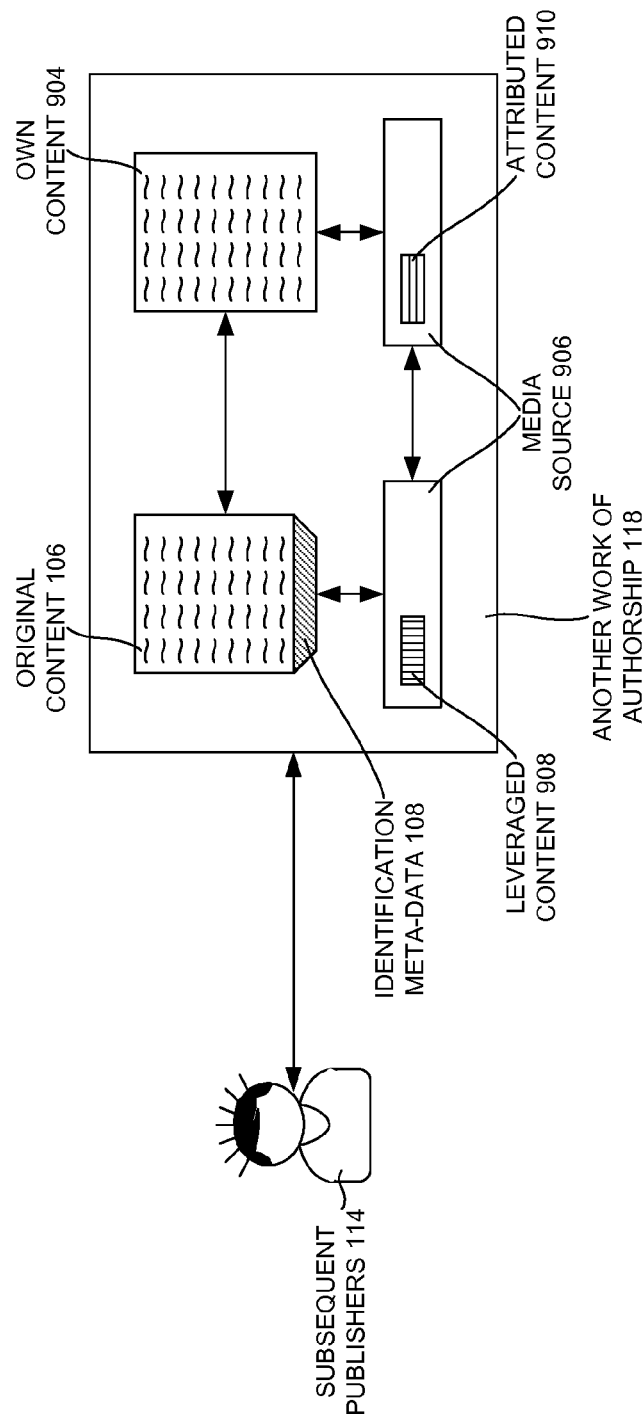
FIG. 9B is a schematic view of a leveraged content and an attributed content inside a media source, according to one or more embodiments.

FIG. 9B illustrates a leveraged content 908 and an attributed content 910 inside a media source 702 in the another work of authorship 112, according to one embodiment. It may be that according to one embodiment that the subsequent publisher 116 may create and publish an another work of authorship 112 which may republish an original content 110 created by a first publisher 114 identifiable with the identification meta-data 108 embedded in the original content 110. The subsequent publisher 116 may also publish his/her own content 904 in the another work of authorship 112 wherein both the original content 110 and the subsequent publisher 116's own content 904 are associable with a media source 702 which may contain a leveraged content 908 (e.g., the first publisher 114's original content 110 that the subsequent publisher 116 has decided to use and republish in the another work of authorship 112), and an attributed content 910 (e.g., portions of the first publisher 114's original content 110 that the subsequent publisher 116 has republished in the another of work of authorship 112) according to one embodiment.

In may be that according to one exemplary embodiment, the leveraged content management portal (e.g., the leveraged content server 100) may determine which original content 110 is trusted in the public wide area network 106 based on a republishing history associated with the original content 110, contributions of the first publisher 114 and other first publishers, and which algorithmically presents preferred content to subsequent publishers. This determination, according to one embodiment, may be based on a criteria that may include a popularity of republishing of the original content 110 and a credibility scoring of the first publisher 114 and other first publishers that may be determined based on an algorithmic page rank of republished destinations and originated sources of the original content 110.

Figure 10:
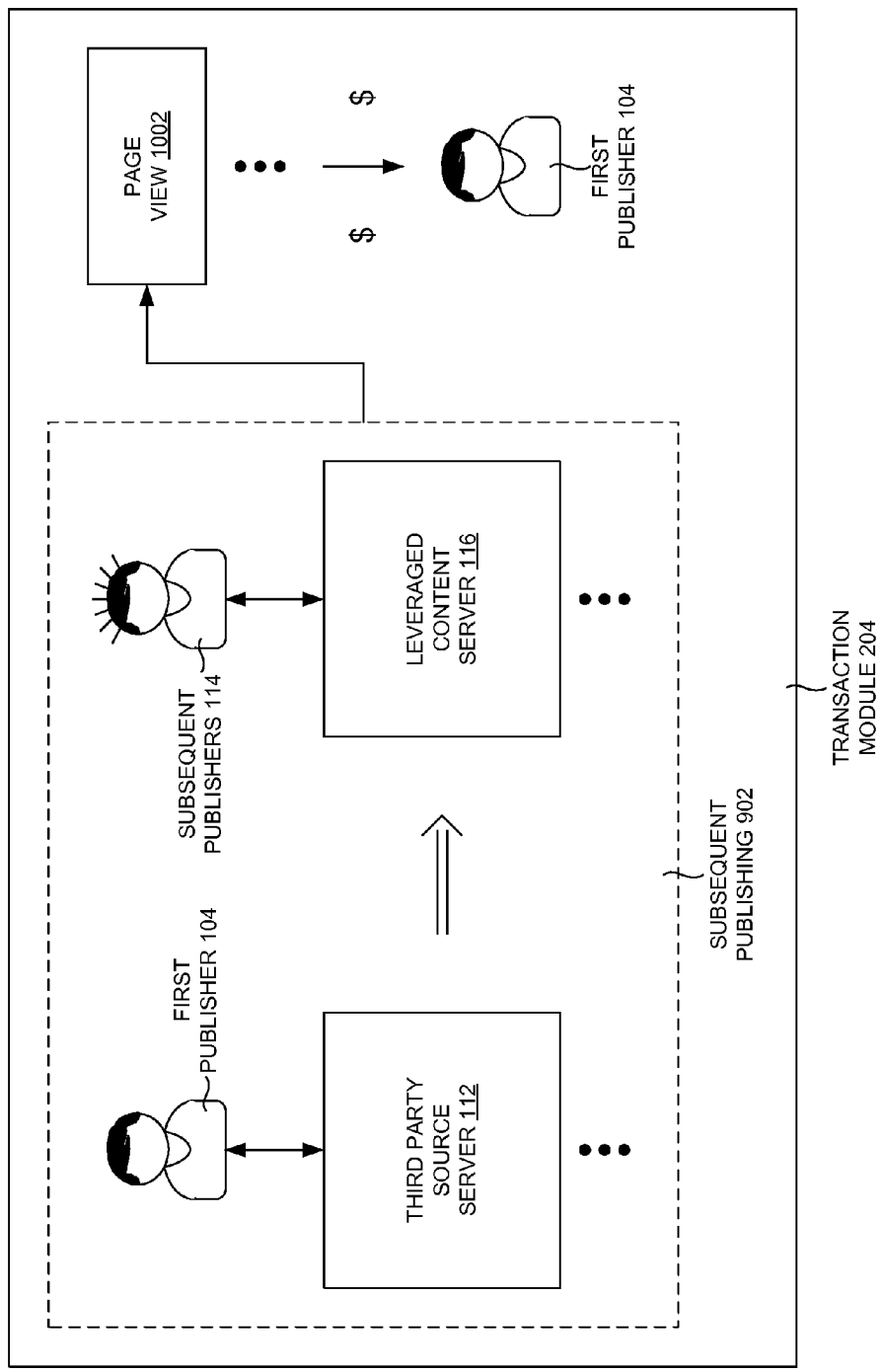
FIG. 10 is a schematic view of a transaction module, according to one or more embodiments.

FIG. 10 illustrates a transaction module 214 according to one embodiment. A subsequent publishing 902 of the original content 110 by the first publisher 114 found in a third party source server 104 may happen in the leveraged content server 100 by the subsequent publisher 116. The transaction module 214 may determine a page view 1002 (e.g., the number of times the republished original content 110 is viewed) and may then determine a financial value attributable to the first publisher 114 based on the page view 1002.

The page view 1002 may be a page impression which may be a request to load a single page of an Internet site that may contain a republishing of the original content 110 by the subsequent publisher 116, according to one embodiment. On the public wide area network 106, a page view 1002 may result from a web user clicking on a link on another HTML page pointing to the page which may contain a republishing of the original content 110 by the subsequent publisher 116, according to one embodiment. The page view 1002 may include a request for the original content 110 found in the another work of authorship 112 whose type may be defined as a page in a log analysis. In a log analysis, the page view 1002 may generate multiple hits as all the resources required to view the page, according to one embodiment.

Figure 11:
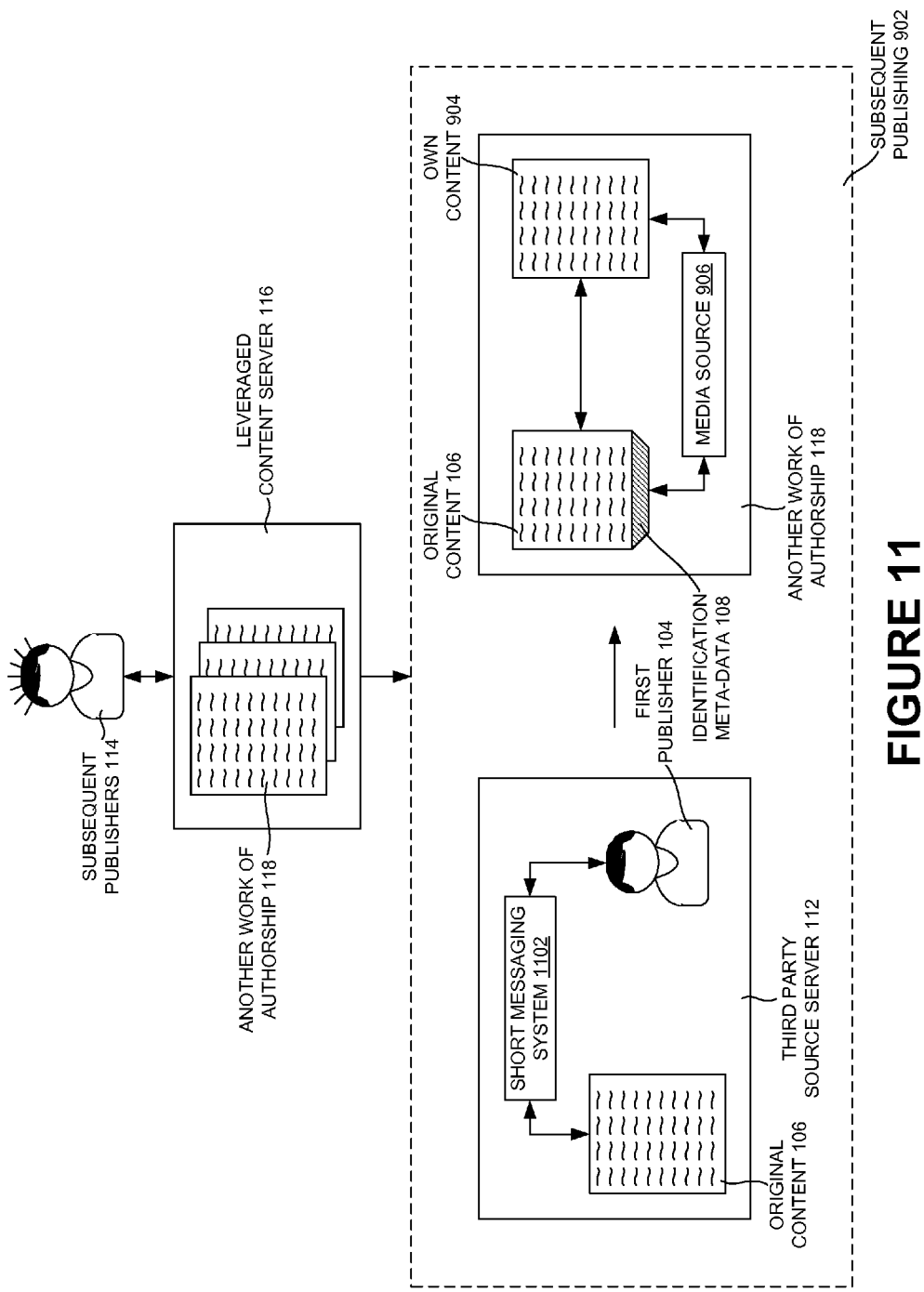
FIG. 11 is a schematic view of functioning between a leveraged content server and the subsequent publishing of the original content, according to one or more embodiments.

FIG. 11 illustrates the functioning between the leveraged content server 100 and the subsequent publishing 902 of the original content 110 in the another work of authorship 112, according to one embodiment. The third party source server 104 of the public wide area network 106 may be a Short Messaging System 1102 (SMS) based publication system that may be monitored by the subsequent publisher 116 through a leveraged content management server (e.g., the leveraged content server 100) in which the another work of authorship 112 may be complied prior to publishing (e.g., republishing by the subsequent publisher 116 as the another work of authorship 112). It may be that according to one embodiment that the subsequent publisher 116 may create and publish an another work of authorship 112 which may republish an original content 110 created by a first publisher 114 identifiable with the identification meta-data 108 embedded in the original content 110. The subsequent publisher 116 may also publish his/her own content 904 in the another work of authorship 112 wherein both the original content 110 and the subsequent publisher 116's own content 904 are associable with a media source 702.

Figure 12A:
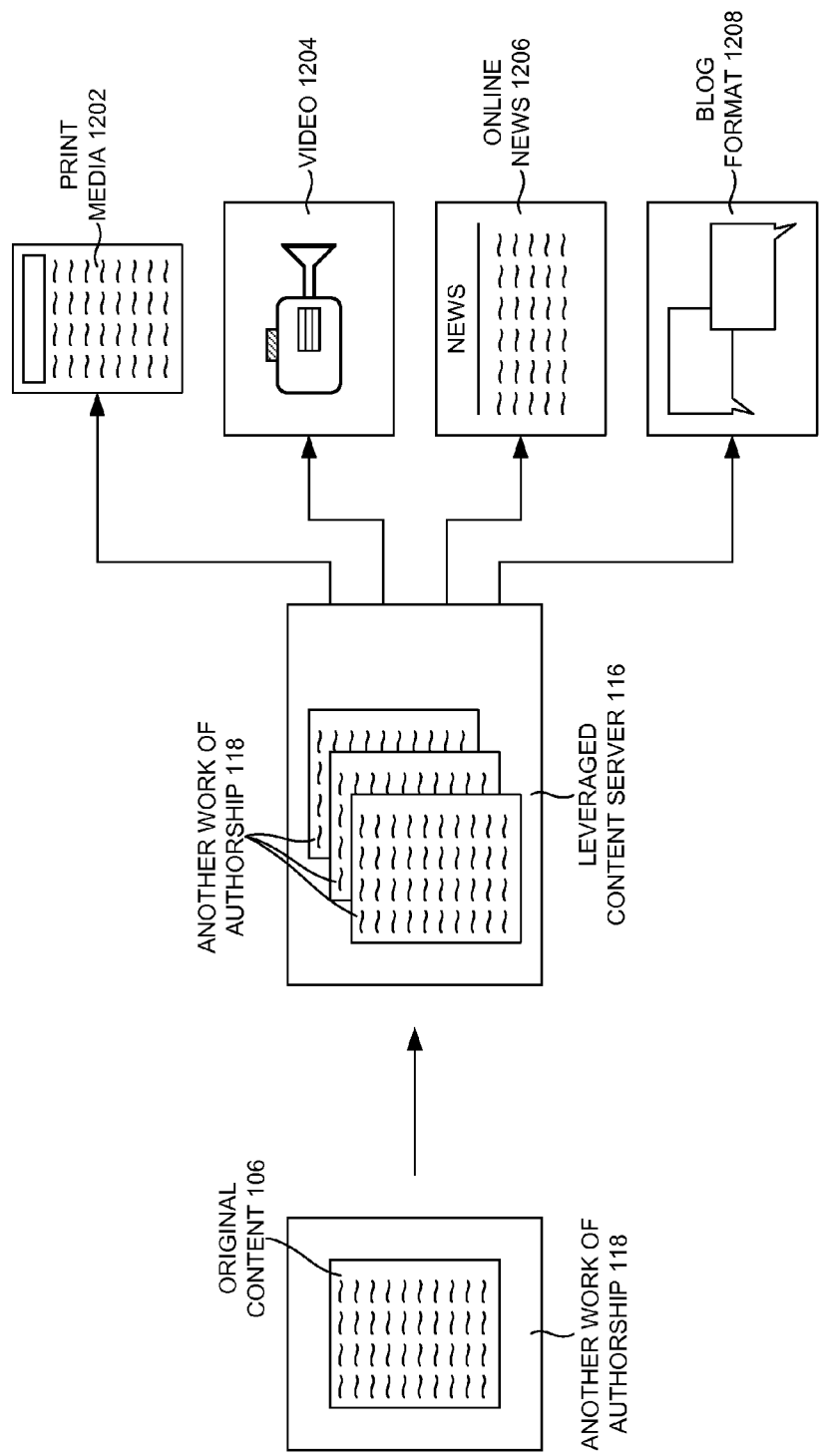
FIG. 12A is a schematic view of formatting the another work of authorship through a leveraged content server to be displayed in a plurality of multimedia formats, according to one or more embodiments.
Figure 12B:
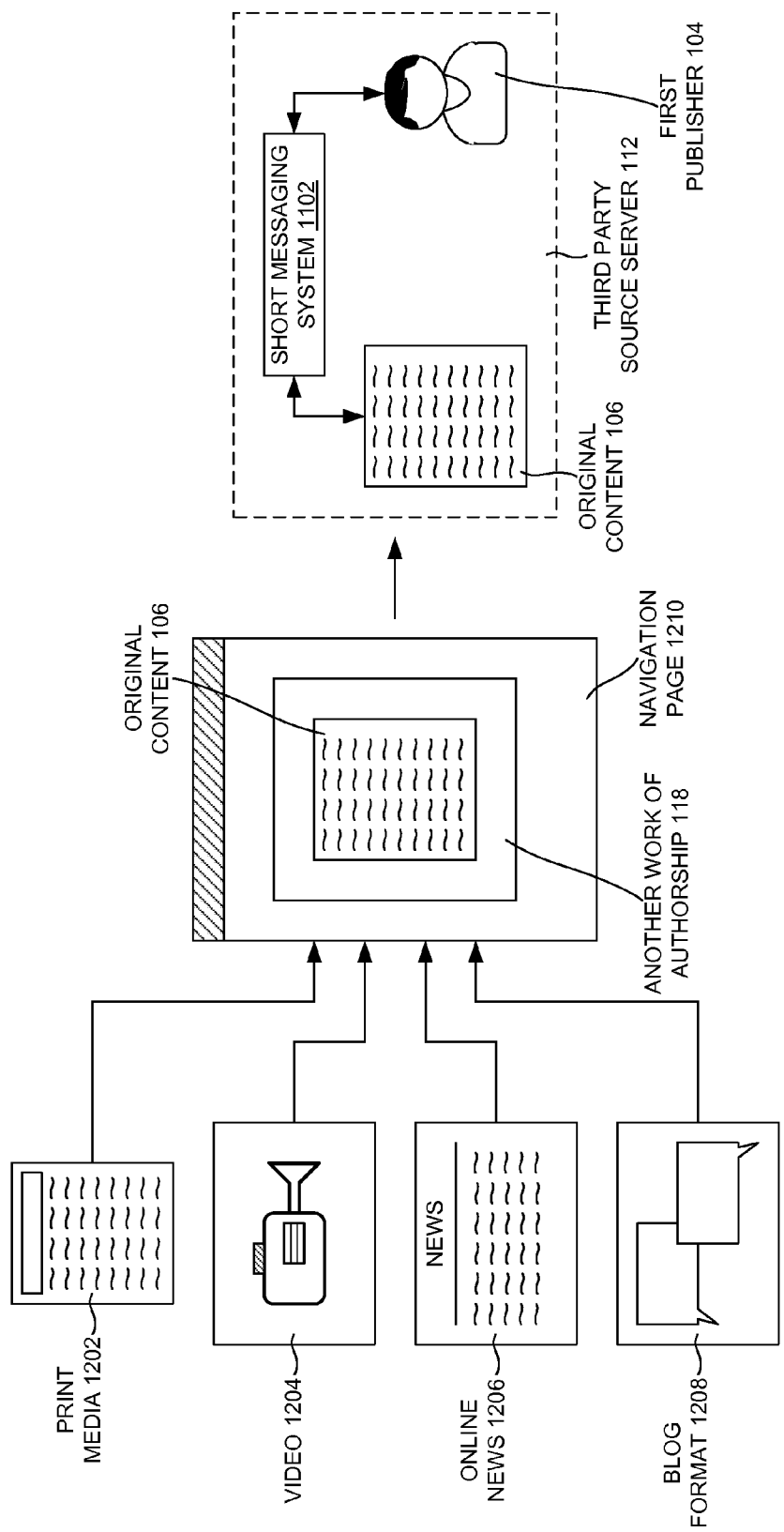
FIG. 12B is a schematic view of formatting the another work of authorship through a leveraged content server to be displayed in a plurality of multimedia formats and a short messaging system, according to one or more embodiments.

FIGS. 12A and 12B illustrate another exemplary embodiment wherein the leveraged content management portal (e.g., the leveraged content server 100), may automatically format the another work of authorship 112 to be optimally displayed in a plurality of multimedia format types including print (e.g., for a newspaper), tablet format (e.g., for the iPad®), video (e.g., for YouTube®), online news (e.g., for The New York Times® reader), and blog format (e.g., for Blogger®, Tumblr®, Posterous®, etc.). In this embodiment, each embedded instance of the original content 110 of the first publisher 114 in the another work of authorship 112 may be directly intractable through a location where the another work of authorship 112 may be published in a manner in which a click-through on the embedded portion of the another work of authorship 112 may transport a navigation pane 1210 (as shown in FIG. 12B) presently comprising a particular republishing of the original content 110 to the Short Messaging System 1102 (SMS) based publication system in which the original content 110 may be first published by the first publisher 114.

According to another exemplary embodiment, the determination based on the algorithmic page rank 1308 of republished destinations and originated sources of the original content 110 may also consider a rating score assessed to the original content 110 and first publishers 114 by subsequent publishers 116. This rating score of the original content 110 and the first publishers 114 may be provided in the leveraged content server 100 such that all subsequent publishers may have access to ratings and associated comments provided by peer subsequent publishers.

Figure 13:
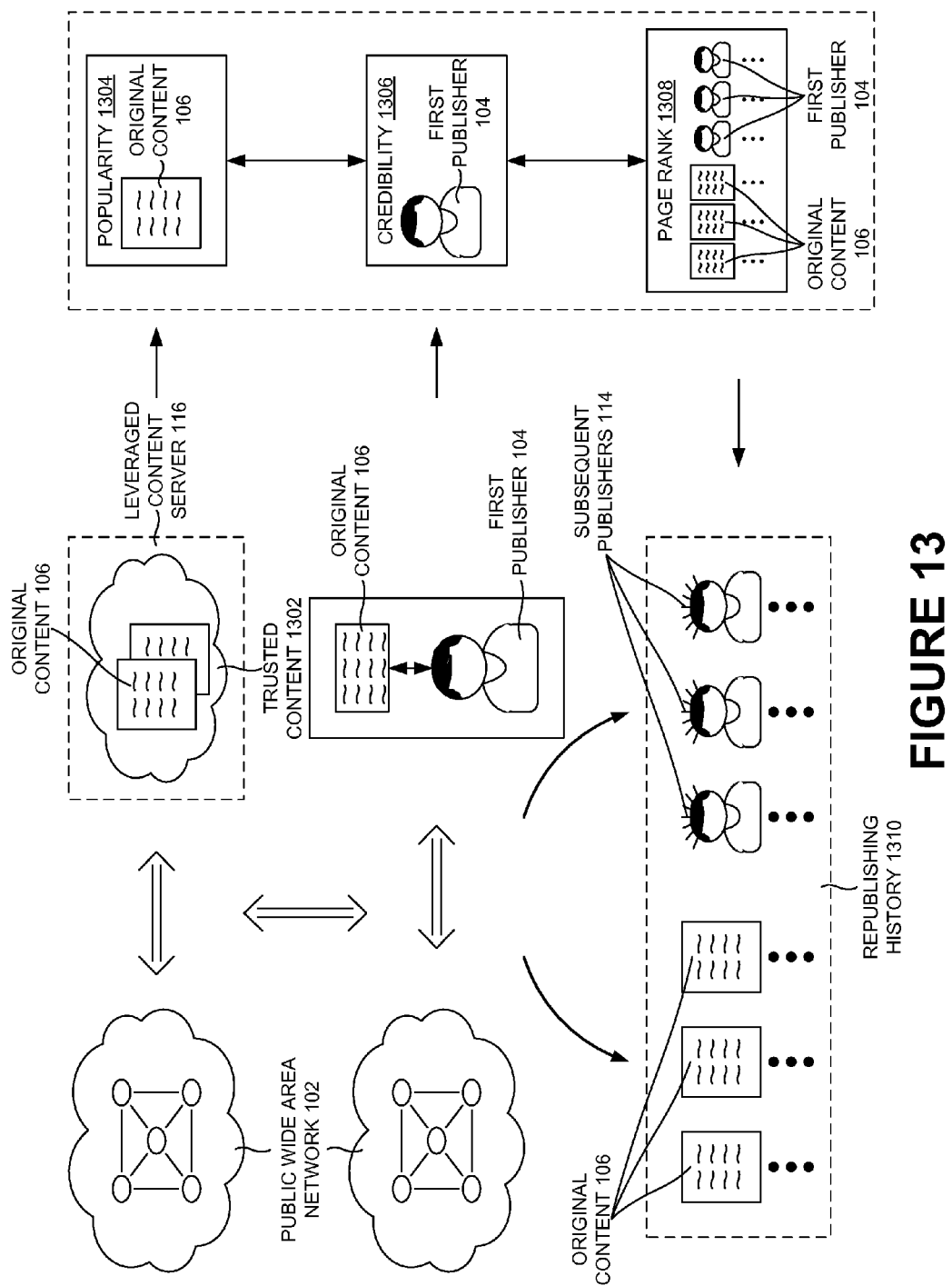
FIG. 13 is a schematic view of a rating score system of the first publisher and original content, according to one or more embodiments.

FIG. 13 illustrates the functioning of the rating score method of the present invention, according to one embodiment. The leveraged content server 100 may determine that certain original content 110 may be trusted content 1302 (original content 110 found in the public wide area network 106 and created by a first publisher 114). According to one embodiment, the leveraged content server 100 may assign a popularity 1304 to the original content 110, a credibility 1306 to the first publisher 114 and a page rank 1308 to both the original content 110 and the first publisher 114. This information (popularity 1304, credibility 1306 and page rank 1308) may be a part of the republishing history 1310 which may associate the information to the original content 110 when republished by subsequent publishers 116, according to one embodiment.

Figure 14:
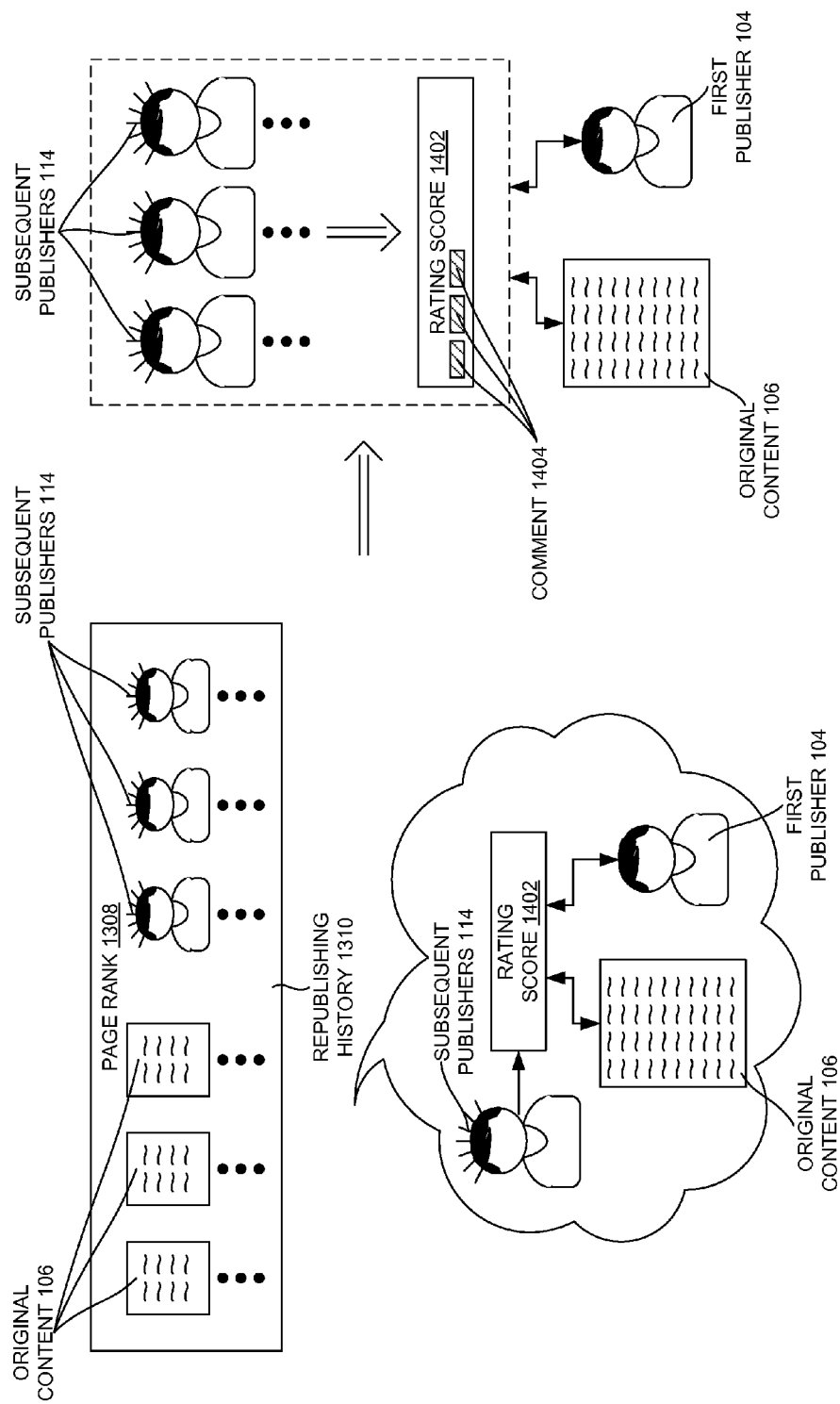
FIG. 14 is a schematic view of a rating score that is assigned to an original content and a first publisher, according to one or more embodiments.

FIG. 14 illustrates a rating score 1402 that may be assigned to the original content 110 and the first publisher 114, according to one embodiment. The popularity 1304, credibility 1306 and page rank 1308 of the original content 110 and the first publisher 114 may be assigned a single rating score 1402 wherein a comment 1404 may be permitted by other subsequent publishers 116. This rating score 1402 may then be assigned to the original content 110 and the first publisher 114 as illustrated in FIG. 14, according to one embodiment.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, the tracking module 206, the notification module 210, and all other modules of FIGS. 1-14 may be enabled using software and/or using transistors, logic gates, and electrical circuits (e.g., application specific integrated ASIC circuitry) such as a security circuit, a recognition circuit, a tactile pattern circuit, an association circuit, a store circuit, a transform circuit, an initial state circuit, an unlock circuit, a deny circuit, a determination circuit, a permit circuit, a user circuit, a region circuit, and other circuits.

Figure 6:
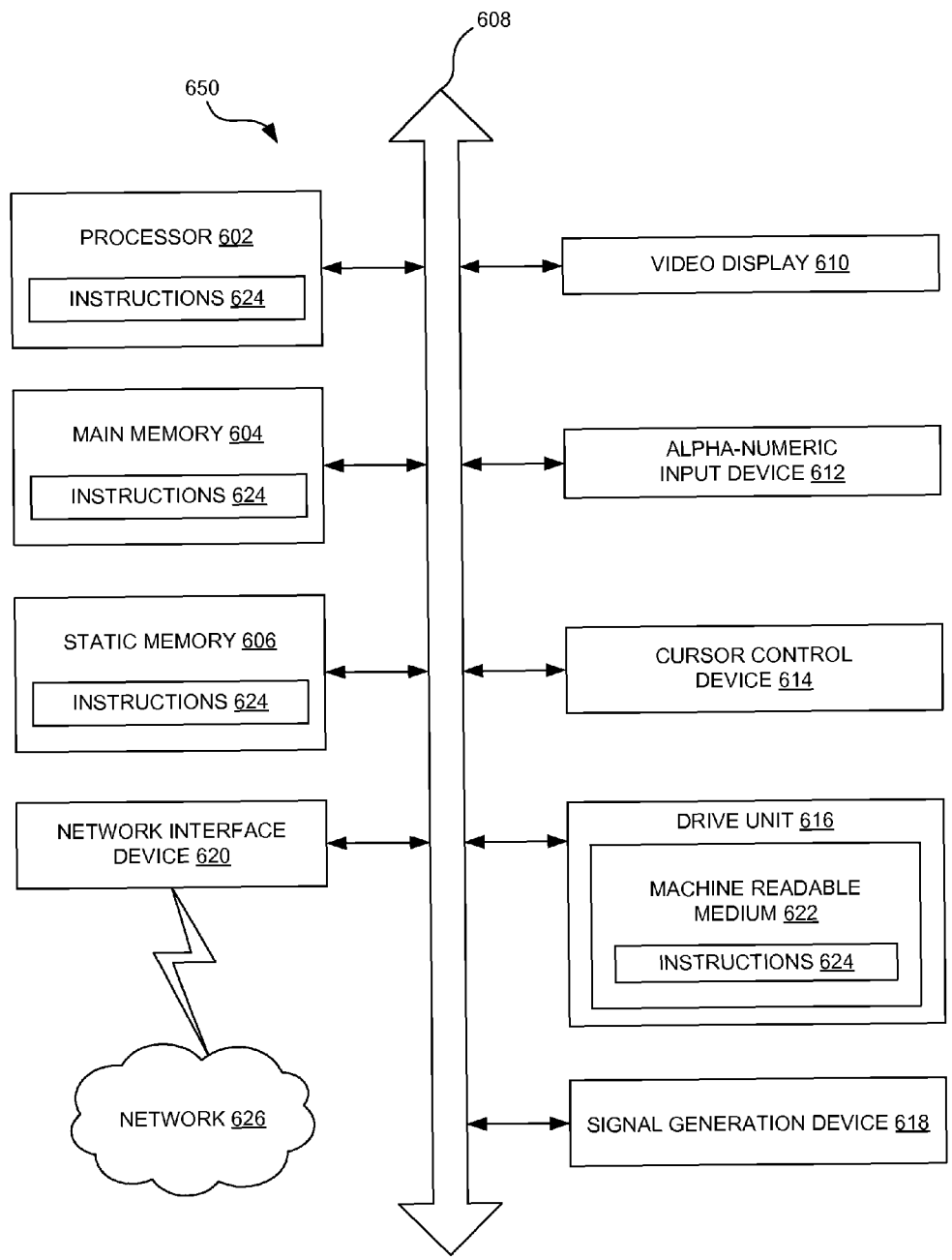
FIG. 6 is a schematic view of a data processing system, according to one or more embodiments.

FIG. 6 may indicate a personal computer and/or the data processing system in which one or more operations disclosed herein may be performed. The processor 602 (for e.g., processor 804 of FIG. 8B) may be a microprocessor, a state machine, an application specific integrated circuit, a field programmable gate array, etc. (e.g., Intel® Pentium® processor, 620 MHz ARM 1176, etc.). The main memory 604 may be a dynamic random access memory and/or a primary memory of a computer system.

The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, a keyboard, a virtual keypad of a touchscreen and/or any other input device of text (e.g., a special device to aid the physically handicapped).

The cursor control device 614 may be a pointing device such as a mouse. The drive unit 616 may be the hard drive, a storage system, and/or other longer term storage subsystem. The signal generation device 618 may be a bios and/or a functional operating system of the data processing system. The network interface device 620 may be a device that performs interface functions such as code conversion, protocol conversion and/or buffering required for communication to and from the network 626. The machine readable medium 622 may provide instructions on which any of the methods disclosed herein may be performed. The instructions 624 may provide source code and/or data code to the processor 602 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Furthermore, it will also be appreciated that the present invention may have utility for online publishing tasks, according to one more embodiments. According to one embodiment, the original content 110 may be published and distributed via the Internet. Such online publishing may also be known as electronic publishing which may include the digital publication of the original content 110 and may also include the electronic publishing of e-books and electronic articles and the development of digital libraries and catalogues. According to one embodiment, this information may be available for use over computer networks (for e.g., the public wide area network 106) and the information may come from other media sources (for e.g., books or magazines) and may be designed specifically for computer delivery.

For example, Joe (based in New York City, United States) may want to publish an online news story about the current situation in Libya involving the unrest brought on by widespread anti-government protests. Joe may know or follow (on social media websites) several Libyan citizens (Ali and Ahmed for example) who may be armed with laptops and digital video cameras. Ali and Ahmed may use Twitter® and Facebook® to post status updates and feeds about the situation on the ground in Libya. They may also digitally record a situation on the ground that may, hypothetically speaking, involve women and children being abused by the military police. They may then post this video on YouTube®. Joe on the other hand, may want to use social media content created by both Ali and Ahmed to publish his own news story. Joe may want to use Ali and Ahmed as his "source" for the news story and may want to their social media content to show how Joe's sources may be attributed to Ali and Ahmed for credibility.

In addition, Joe's news story (containing snippets of social media content created by Ali, Ahmed and other persons) may be picked up by other media and social media websites. Ali and Ahmed's social media content may be assigned a rank. If Ali's content (as incorporated by Joe in his news story) is re-used by other media websites or news organizations more often than Ahmed's social media content (based on a ranking score), Ali may be compensated financially for being the primary source in Joe's story and for taking the risk to document atrocities that may be occurring on the ground in Libya. In addition, Ali's credibility and reliability as a primary source on the ground in Libya may be attributed and confirmed with identification meta-data that is present in Ali's social media content. This identification meta-data may provide real time information about the timeline of event, the location of event, date of the event, and other geographical indications that may add credibility and reliability to any of Ali's future social media content covering further events on the ground in Libya or elsewhere.

Joe on the other hand may not need to leave New York City in order to communicate and collaborate with Ali and Ahmed (as opposed to the traditional new gatherer who may have to fly to Libya and track down Ali or Ahmed in person). An and Ahmed may become regular contributors and sources to Joe's news stories. In addition, since may have a copyright in his original online publication of original content, he may be compensated by other news organizations if they decide to re-publish Joe's story, while at the same time increasing the credibility and exposure of Ali, Joe's local collaborator on the ground in Libya. Ali may be considered the first publisher of his original content and Joe may be considered the subsequent publisher of his news story (which may be called "another work of authorship"). Re-publishing of Ali's original content multiple times by different organizations across different platforms may add to the credibility of Ali and Joe as reputable publishers and creators of original content. Such a source attribution (identifying Ali through identification meta-data) of embedded content (Ali's on the ground information gathering posted on social media) may result in a collaborative and a powerful way in which social media may be utilized to incentivize and drive online publication and at the same time may provide a way for publishers (online or otherwise) to harvest social media technologies to empower original content publishers across the world.

Although the present embodiments have been described with reference to specific example embodiments, it will be evident that various modifications may be made to these embodiments without departing from the broader spirit and scope of the various embodiments. Also, for example, the various mobile devices described herein may not necessarily be inside a vehicle. Further, for example, the various devices and modules described herein may be enabled and operated using hardware circuitry, firmware, software or any combination of hardware, firmware, and software (e.g., embodied in a machine readable medium)

In addition, it will be appreciated that the various operations, processes, and methods disclosed herein may be embodied in a machine-readable medium and/or a machine accessible medium compatible with a data processing system (e.g., computer devices), and may be performed in any order (e.g., including means for achieving the various operations). Accordingly, the specification and the drawings are regarded in an illustrative rather than a restrictive sense.

What is claimed is:

1. A source attribution system comprising:
a tracking module configured to generate an identification meta-data to be associated with an original content of a first publisher that originates in a third-party source server of a public wide area network such that the original content is attributable to the first publisher through the identification meta-data associated thereto with the original content when the original content having the associated identification meta-data is republished;
a processor communicatively coupled with a non-transitory memory which is configured to determine that a subsequent publishing of the original content is an embedded portion of another work of authorship when a communication of the identification meta-data is extracted from a server in which the subsequent publishing is manifested and transmitted from the server to the processor;

a notification module to automatically generate a communication having at least one of an identity data of a subsequent publisher and a temporal data associated with the subsequent publishing that is transmitted to the first publisher of the original content when the another work of authorship is published with the embedded portion having the original content; and a transaction module to provide a financial incentive to the first publisher proportional to at least one of an aggregate number of views, unique visitor count, bounce rate, social sharing rate, and commenting rate, associated with subsequent publishing of the original content in the another work of authorship;

wherein the another work of authorship is a separately copyrightable work of authorship comprising its own content in addition to leveraged and attributed content from disparate media sources, wherein the third-party source of the public wide area network is a Short Messaging System based publication system that is monitored by the subsequent publisher through a leveraged content server in which the another work of authorship is compiled prior to publishing, wherein the leveraged content server automatically formats the another work of authorship to be optimally displayed in a plurality of multimedia types including print, video, a type that is able to be displayed on a tablet, and types that are able to display online news, and/or a blog, wherein each embedded instance of the original content of the first publisher in the another works of authorship are interactable directly through a location where the another work of authorship is published in a manner in which a click-through on the embedded portion of the another work of authorship transports a navigation pane presently comprising a particular republishing of the original content to the Short Messaging System based publication system in which the original content is first published by the first publisher, wherein the leveraged content server automatically determines which original content is trusted in the public wide area network based on republishing history associated with the original content contributions of the first publisher and other first publishers, and which algorithmically presents preferred content to subsequent publishers based on a criteria including a popularity of republishing of the original content and a credibility scoring of the first publisher and other publishers that is determined based on an algorithmic page rank of republished destinations and originated sources of the original content.

2. The source attribution system of claim 1: wherein the determination based on the algorithmic page rank of republished destinations and originated sources of the original content also considers a rating score assessed to original content and first publishers by subsequent publishers who provide this rating score of original content and first publishers in the leveraged content server such that all subsequent publishers have access privileges to access ratings and associated comments provided by peer subsequent publishers.

\* \* \* \* \*

UNITED STATES PATENT AND TRADEMARK OFFICE
CERTIFICATE OF CORRECTION

PATENT NO. : 8,082,486 B1
APPLICATION NO. : 13/156368
DATED : December 20, 2011
INVENTOR(S) : Xavier Damman and Burt Herman It is certified that error appears in the above-identified patent and that said Letters Patent is hereby corrected as shown below:

In the Specification

The Detailed Description in the above mentioned Letters Patent contains minor typographical errors related to figure number references.

In column 6, line 8, delete "100" and replace with --116--.
In column 6, line 8, delete "102" and replace with --110--.
In column 6, line 9, delete "104" and replace with --112--.
In column 6, line 11, delete "106" and replace with --102--.
In column 6, line 13, delete "110" and replace with --106--.
In column 6, line 14, delete "102" and replace with --110--.
In column 6, line 15, delete "112" and replace with --118--.
In column 6, line 16, delete "100" and replace with --116--.
In column 6, line 17, delete "102" and replace with --110--.
In column 6, line 18, delete "110" and replace with --106--.
In column 6, line 19, delete "112" and replace with --118--.
In column 6, line 20, delete each occurrence of "100" and replace each occurrence with --116--.
In column 6, line 22, delete "112" and replace with --118--.
In column 6, line 22, delete "110" and replace with --106--.
In column 6, line 24, delete "112" and replace with --118--.
In column 6, line 25, delete "100" and replace with --116--.
In column 6, line 26, delete "100" and replace with --116--.
In column 6, line 30, delete "100" and replace with --116--.
In column 6, line 30, delete "200" and replace with --202--.
In column 6, line 31, delete "202" and replace with --212--.
In column 6, line 31, delete "204" and replace with --218--.
In column 6, line 32, delete "206" and replace with --204--.
In column 6, line 32, delete "208" and replace with --206--.
In column 6, line 32, delete "210" and replace with --208--.

Signed and Sealed this
Twenty-ninth Day of July, 2014

Michelle K. Lee
*Deputy Director of the United States Patent and Trademark Office*

CERTIFICATE OF CORRECTION (continued)
U.S. Pat. No. 8,082,486 B1

In column 6, line 33, delete "212" and replace with --214--.
In column 6, line 33, delete "214" and replace with --210--.
In column 6, line 36, delete "200" and replace with --202--.
In column 6, line 38, delete "200" and replace with --202--.
In column 6, line 39, delete "100" and replace with --116--.
In column 6, line 41, delete "200" and replace with --202--.
In column 6, line 43, delete "114" and replace with --104--.
In column 6, line 43, delete "116" and replace with --114--.
In column 6, line 44, delete "100" and replace with --116--.
In column 6, line 45, delete "102" and replace with --110--.
In column 6, line 45, delete "104" and replace with --112--.
In column 6, line 47, delete "110" and replace with --106--.
In column 6, line 48, delete "114" and replace with --104--.
In column 6, line 49, delete "102" and replace with --110--.
In column 6, line 50, delete "116" and replace with --114--.
In column 6, line 51, delete "100" and replace with --116--.
In column 6, line 52, delete "114" and replace with --104--.
In column 6, line 53, delete "116" and replace with --114--.
In column 6, line 55, delete "100" and replace with --116--.
In column 6, line 58, delete "110" and replace with --106--.
In column 6, line 59, delete "102" and replace with --110--.
In column 6, line 60, delete "114" and replace with --104--.
In column 6, line 60, delete "110" and replace with --106--.
In column 6, line 62, delete "112" and replace with --118--.
In column 6, line 63, delete "116" and replace with --114--.
In column 6, line 63, delete "100" and replace with --116--.
In column 6, line 64, delete "104" and replace with --112--.
In column 6, line 65, delete "102" and replace with --110--.
In column 6, line 66, delete "106" and replace with --102--.
In column 6, line 66, delete "100" and replace with --116--.
In column 7, line 1, delete "110" and replace with --106--.
In column 7, line 1, delete "114" and replace with --104--.
In column 7, line 2, delete "112" and replace with --118--.
In column 7, line 3, delete "102" and replace with --110--.
In column 7, line 5, delete "110" and replace with --106--.
In column 7, line 5, delete "114" and replace with --104--.
In column 7, line 6, delete "102" and replace with --110--.
In column 7, line 7, delete "104" and replace with --112--.
In column 7, line 8, delete "110" and replace with --106--.
In column 7, line 9, delete "114" and replace with --104--.
In column 7, line 10, delete "102" and replace with --110--.
In column 7, line 11, delete "110" and replace with --106--.
In column 7, line 12, delete "102" and replace with --110--.
In column 7, line 13, delete "104" and replace with --112--.
In column 7, line 13, delete "110" and replace with --106--.

CERTIFICATE OF CORRECTION (continued)
U.S. Pat. No. 8,082,486 B1

In column 7, line 14, delete "104" and replace with --112--.
In column 7, line 16, delete "106" and replace with --102--.
In column 7, line 18, delete each occurrence of "104" and replace each occurrence with --112--.
In column 7, line 22, delete "106" and replace with --102--.
In column 7, line 23, delete "104" and replace with --112--.
In column 7, line 24, delete "110" and replace with --106--.
In column 7, line 25, delete "110" and replace with --106--.
In column 7, line 27, delete "104" and replace with --112--.
In column 7, line 28, delete "100" and replace with --116--.
In column 7, line 29, delete "102" and replace with --110--.
In column 7, line 30, delete "106" and replace with --102--.
In column 7, line 31, delete "106" and replace with --102--.
In column 7, line 33, delete "104" and replace with --112--.
In column 7, line 38, delete "110" and replace with --106--.
In column 7, line 39, delete "110" and replace with --106--.
In column 7, line 40, delete "114" and replace with --104--.
In column 7, line 41, delete "114" and replace with --104--.
In column 7, line 42, delete "110" and replace with --106--.
In column 7, line 43, delete "106" and replace with --102--.
In column 7, line 46, delete "110" and replace with --106--.
In column 7, line 47, delete "110" and replace with --106--.
In column 7, line 48, delete "110" and replace with --106--.
In column 7, line 49, delete "110" and replace with --106--.
In column 7, line 50, delete "110" and replace with --106--.
In column 7, line 53, delete "110" and replace with --106--.
In column 7, line 57, delete "114" and replace with --104--.
In column 7, line 58, delete "110" and replace with --106--.
In column 7, line 66, delete "110" and replace with --106--.
In column 8, line 3, delete "110" and replace with --106--.
In column 8, line 5, delete "114" and replace with --104--.
In column 8, line 6, delete "102" and replace with --110--.
In column 8, line 7, delete "106" and replace with --102--.
In column 8, line 7, delete "110" and replace with --106--.
In column 8, line 12, delete "106" and replace with --102--.
In column 8, line 13, delete "110" and replace with --106--.
In column 8, line 13, delete "114" and replace with --104--.
In column 8, line 15, delete "110" and replace with --106--.
In column 8, line 16, delete "102" and replace with --110--.
In column 8, line 17, delete "110" and replace with --106--.
In column 8, line 18, delete "112" and replace with --118--.
In column 8, line 19, delete "112" and replace with --118--.
In column 8, line 20, delete "100" and replace with --116--.
In column 8, line 21, delete "110" and replace with --106--.
In column 8, line 24, delete "114" and replace with --104--.
In column 8, line 25, delete "110" and replace with --106--.

CERTIFICATE OF CORRECTION (continued)
U.S. Pat. No. 8,082,486 B1

In column 8, line 27, delete "110" and replace with --106--.
In column 8, line 29, delete "110" and replace with --106--.
In column 8, line 30, delete "112" and replace with --118--.
In column 8, line 32, delete "112" and replace with --118--.
In column 8, line 34, delete "112" and replace with --118--.
In column 8, line 35, delete "112" and replace with --118--.
In column 8, line 36, delete "116" and replace with --114--.
In column 8, line 37, delete "100" and replace with --116--.
In column 8, line 38, delete "112" and replace with --118--.
In column 8, line 39, delete "110" and replace with --106--.
In column 8, line 41, delete "112" and replace with --118--.
In column 8, line 44, delete "112" and replace with --118--.
In column 8, line 46, delete "110" and replace with --106--.
In column 8, line 47, delete "114" and replace with --104--.
In column 8, line 47, delete "112" and replace with --118--.
In column 8, line 48, delete "116" and replace with --114--.
In column 8, line 49, delete "114" and replace with --104--.
In column 8, line 52, delete "104" and replace with --112--.
In column 8, line 53, delete "106" and replace with --102--.
In column 8, line 53, delete "114" and replace with --104--.
In column 8, line 56, delete "114" and replace with --104--.
In column 8, line 57, delete "104" and replace with --112--.
In column 8, line 57, delete "110" and replace with --106--.
In column 8, line 59, delete "116" and replace with --114--.
In column 8, line 60, delete "106" and replace with --102--.
In column 8, line 61, delete "116" and replace with --114--.
In column 8, line 62, delete "110" and replace with --106--.
In column 8, line 62, delete "114" and replace with --104--.
In column 8, line 63, delete "112" and replace with --118--.
In column 8, line 65, delete "116" and replace with --114--.
In column 8, line 66, delete "112" and replace with --118--.
In column 8, line 67, delete "110" and replace with --106--.
In column 8, line 67, delete "114" and replace with --104--.
In column 9, line 1, delete "116" and replace with --114--.
In column 9, line 1, delete "114" and replace with --104--.
In column 9, line 4, delete "116" and replace with --114--.
In column 9, line 5, delete "112" and replace with --118--.
In column 9, line 6, delete "110" and replace with --106--.
In column 9, line 7, delete "104" and replace with --112--.
In column 9, line 8, delete "112" and replace with --118--.
In column 9, line 10, delete "100" and replace with --116--.
In column 9, line 10, delete "112" and replace with --118--.
In column 9, line 11, delete "106" and replace with --102--.
In column 9, line 14, delete "100" and replace with --116--.
In column 9, line 17, delete "100" and replace with --116--.

CERTIFICATE OF CORRECTION (continued)
U.S. Pat. No. 8,082,486 B1

In column 9, line 18, delete "112" and replace with --118--.
In column 9, line 21, delete "100" and replace with --116--.
In column 9, line 22, delete "112" and replace with --118--.
In column 9, line 23, delete "114" and replace with --104--.
In column 9, line 24, delete "112" and replace with --118--.
In column 9, line 26, delete "100" and replace with --116--.
In column 9, line 27, delete "100" and replace with --116--.
In column 9, line 29, delete "200" and replace with --202--.
In column 9, line 30, delete "110" and replace with --106--.
In column 9, line 31, delete "102" and replace with --110--.
In column 9, line 31, delete "114" and replace with --104--.
In column 9, line 32, delete "110" and replace with --106--.
In column 9, line 34, delete "112" and replace with --118--.
In column 9, line 34, delete "116" and replace with --114--.
In column 9, line 35, delete "200" and replace with --202--.
In column 9, line 36, delete "202" and replace with --212--.
In column 9, line 37, delete "116" and replace with --114--.
In column 9, line 38, delete "112" and replace with --118--.
In column 9, line 39, delete "200" and replace with --202--.
In column 9, line 40, delete "110" and replace with --106--.
In column 9, line 41, delete "114" and replace with --104--.
In column 9, line 42, delete "112" and replace with --118--.
In column 9, line 44, delete "200" and replace with --202--.
In column 9, line 45, delete "116" and replace with --114--.
In column 9, line 45, delete "110" and replace with --106--.
In column 9, line 46, delete "114" and replace with --104--.
In column 9, line 47, delete "112" and replace with --118--.
In column 9, line 48, delete "200" and replace with --202--.
In column 9, line 51, delete "210" and replace with --202--.
In column 9, line 55, delete "200" and replace with --202--.
In column 9, line 56, delete "112" and replace with --118--.
In column 9, line 60, delete "200" and replace with --202--.
In column 9, line 60, delete "116" and replace with --114--.
In column 9, line 61, delete "112" and replace with --118--.
In column 9, line 62, delete "106" and replace with --102--.
In column 9, line 64, delete "100" and replace with --116--.
In column 9, line 64, delete "202" and replace with --212--.
In column 9, line 65, delete "202" and replace with --212--.
In column 9, line 65, delete "112" and replace with --118--.
In column 9, line 66, delete "112" and replace with --118--.
In column 9, line 67, delete "106" and replace with --102--.
In column 10, line 1, delete "202" and replace with --212--.
In column 10, line 2, delete "110" and replace with --106--.
In column 10, line 2, delete "114" and replace with --104--.
In column 10, line 3, delete "202" and replace with --212--.

CERTIFICATE OF CORRECTION (continued)
U.S. Pat. No. 8,082,486 B1

In column 10, line 4, delete "112" and replace with --118--.
In column 10, line 5, delete "116" and replace with --114--.
In column 10, line 6, delete "202" and replace with --212--.
In column 10, line 8, delete "112" and replace with --118--.
In column 10, line 9, delete "106" and replace with --102--.
In column 10, line 10, delete "202" and replace with --212--.
In column 10, line 11, delete "204" and replace with --218--.
In column 10, line 12, delete "110" and replace with --106--.
In column 10, line 13, delete "112" and replace with --118--.
In column 10, line 14, delete "204" and replace with --218--.
In column 10, line 14, delete "110" and replace with --106--.
In column 10, line 15, delete "114" and replace with --104--.
In column 10, line 16, delete "116" and replace with --114--.
In column 10, line 17, delete "204" and replace with --218--.
In column 10, line 18, delete "114" and replace with --104--.
In column 10, line 19, delete "116" and replace with --114--.
In column 10, line 20, delete "204" and replace with --218--.
In column 10, line 20, delete "114" and replace with --104--.
In column 10, line 21, delete "116" and replace with --114--.
In column 10, line 22, delete "110" and replace with --106--.
In column 10, line 23, delete "112" and replace with --118--.
In column 10, line 24, delete "204" and replace with --218--.
In column 10, line 25, delete "110" and replace with --106--.
In column 10, line 26, delete "112" and replace with --118--.
In column 10, line 28, delete "204" and replace with --218--.
In column 10, line 29, delete "110" and replace with --106--.
In column 10, line 30, delete "112" and replace with --118--.
In column 10, line 31, delete "204" and replace with --218--.
In column 10, line 32, delete "114" and replace with --104--.
In column 10, line 33, delete "116" and replace with --114--.
In column 10, line 34, delete "110" and replace with --106--.
In column 10, line 35, delete "112" and replace with --118--.
In column 10, line 36, delete "100" and replace with --116--.
In column 10, line 37, delete "206" and replace with --204--.
In column 10, line 38, delete "110" and replace with --106--.
In column 10, line 39, delete "114" and replace with --104--.
In column 10, line 40, delete "104" and replace with --112--.
In column 10, line 40, delete "106" and replace with --102--.
In column 10, line 42, delete "206" and replace with --204--.
In column 10, line 42, delete "110" and replace with --106--.
In column 10, line 43, delete "114" and replace with --104--.
In column 10, line 44, delete "206" and replace with --204--.
In column 10, line 45, delete "110" and replace with --106--.
In column 10, line 46, delete "112" and replace with --118--.
In column 10, line 47, delete "110" and replace with --106--.

CERTIFICATE OF CORRECTION (continued)
U.S. Pat. No. 8,082,486 B1

In column 10, line 47, delete "112" and replace with --118--.
In column 10, line 49, delete "208" and replace with --204--.
In column 10, line 50, delete "208" and replace with --206--.
In column 10, line 50, delete "100" and replace with --116--.
In column 10, line 52, delete "208" and replace with --206--.
In column 10, line 53, delete "116" and replace with --114--.
In column 10, line 53, delete "110" and replace with --106--.
In column 10, line 54, delete "112" and replace with --118--.
In column 10, line 57, delete "100" and replace with --116--.
In column 10, line 59, delete "100" and replace with --116--.
In column 10, line 60, delete "208" and replace with --206--.
In column 10, line 62, delete "100" and replace with --116--.
In column 10, line 62, delete "210" and replace with --208--.
In column 10, line 63, delete "208" and replace with --206--.
In column 10, line 63, delete "210" and replace with --208--.
In column 10, line 66, delete "116" and replace with --114--.
In column 11, line 1, delete "112" and replace with --118--.
In column 11, line 3, delete "112" and replace with --118--.
In column 11, line 5, delete "112" and replace with --118--.
In column 11, line 5, delete "210" and replace with --208--.
In column 11, line 7, delete "114" and replace with --104--.
In column 11, line 7, delete "110" and replace with --106--.
In column 11, line 8, delete "112" and replace with --118--.
In column 11, line 9, delete "110" and replace with --106--.
In column 11, line 10, delete "210" and replace with --208--.
In column 11, line 11, delete "212" and replace with --214--.
In column 11, line 13, delete "110" and replace with --106--.
In column 11, line 13, delete "114" and replace with --104--.
In column 11, line 14, delete "116" and replace with --114--.
In column 11, line 15, delete "114" and replace with --104--.
In column 11, line 16, delete "212" and replace with --214--.
In column 11, line 17, delete "210" and replace with --208--.
In column 11, line 19, delete "100" and replace with --116--.
In column 11, line 20, delete "214" and replace with --210--.
In column 11, line 21, delete "114" and replace with --104--.
In column 11, line 23, delete "110" and replace with --106--.
In column 11, line 23, delete "112" and replace with --118--.
In column 11, line 24, delete "214" and replace with --210--.
In column 11, line 25, delete "116" and replace with --114--.
In column 11, line 25, delete "114" and replace with --104--.
In column 11, line 26, delete "116" and replace with --114--.
In column 11, line 27, delete "112" and replace with --118--.
In column 11, line 28, delete "110" and replace with --106--.
In column 11, line 29, delete "112" and replace with --118--.
In column 11, line 30, delete "116" and replace with --114--.

CERTIFICATE OF CORRECTION (continued)
U.S. Pat. No. 8,082,486 B1

In column 11, line 31, delete "110" and replace with --106--.
In column 11, line 32, delete "114" and replace with --104--.
In column 11, line 32, delete "116" and replace with --114--.
In column 11, line 34, delete "110" and replace with --106--.
In column 11, line 35, delete "114" and replace with --104--.
In column 11, line 36, delete "214" and replace with --210--.
In column 11, line 39, delete "112" and replace with --118--.
In column 11, line 40, delete "110" and replace with --106--.
In column 11, line 41, delete "114" and replace with --104--.
In column 11, line 41, delete "116" and replace with --114--.
In column 11, line 42, delete "114" and replace with --104--.
In column 11, line 43, delete "116" and replace with --114--.
In column 11, line 44, delete "110" and replace with --106--.
In column 11, line 44, delete "114" and replace with --104--.
In column 11, line 46, delete "110" and replace with --106--.
In column 11, line 47, delete "112" and replace with --118--.
In column 11, line 48, delete "112" and replace with --118--.
In column 11, line 51, delete "110" and replace with --106--.
In column 11, line 53, delete "114" and replace with --104--.
In column 11, line 54, delete "110" and replace with --106--.
In column 11, line 55, delete "112" and replace with --118--.
In column 11, line 56, delete "116" and replace with --114--.
In column 11, line 58, delete "114" and replace with --104--.
In column 11, line 59, delete "104" and replace with --112--.
In column 11, line 60, delete "106" and replace with --102--.
In column 11, line 60, delete "110" and replace with --106--.
In column 11, line 63, delete "114" and replace with --104--.
In column 11, line 63, delete "110" and replace with --106--.
In column 11, line 64, delete "116" and replace with --114--.
In column 11, line 65, delete "116" and replace with --114--.
In column 11, line 66, delete "110" and replace with --106--.
In column 11, line 67, delete "114" and replace with --104--.
In column 12, line 2, delete "116" and replace with --114--.
In column 12, line 2, delete "114" and replace with --104--.
In column 12, line 3, delete "110" and replace with --106--.
In column 12, line 4, delete "112" and replace with --118--.
In column 12, line 5, delete "116" and replace with --114--.
In column 12, line 6, delete "116" and replace with --114--.
In column 12, line 6, delete "114" and replace with --104--.
In column 12, line 7, delete "112" and replace with --118--.
In column 12, line 10, delete "114" and replace with --104--.
In column 12, line 11, delete "110" and replace with --106--.
In column 12, line 11, delete "112" and replace with --118--.
In column 12, line 13, delete "110" and replace with --106--.
In column 12, line 15, delete "110" and replace with --106--.

CERTIFICATE OF CORRECTION (continued)
U.S. Pat. No. 8,082,486 B1

In column 12, line 16, delete "104" and replace with --112--.
In column 12, line 19, delete "114" and replace with --104--.
In column 12, line 20, delete "100" and replace with --116--.
In column 12, line 20, delete "110" and replace with --106--.
In column 12, line 22, delete "114" and replace with --104--.
In column 12, line 24, delete "116" and replace with --114--.
In column 12, line 25, delete "110" and replace with --106--.
In column 12, line 27, delete "104" and replace with --112--.
In column 12, line 27, delete "100" and replace with --116--.
In column 12, line 30, delete "114" and replace with --104--.
In column 12, line 34, delete "110" and replace with --106--.
In column 12, line 35, delete each occurrence of "112" and replace each occurrence with --118--.
In column 12, line 37, delete "116" and replace with --114--.
In column 12, line 41, delete "114" and replace with --104--.
In column 12, line 42, delete "110" and replace with --106--.
In column 12, line 43, delete "110" and replace with --106--.
In column 12, line 45, delete "110" and replace with --106--.
In column 12, line 47, delete "116" and replace with --114--.
In column 12, line 49, delete "114" and replace with --104--.
In column 12, line 50, delete "112" and replace with --118--.
In column 12, line 54, delete "502" and replace with --118--.
In column 12, line 59, delete "112" and replace with --118--.
In column 13, line 5, delete "110" and replace with --106--.
In column 13, line 6, delete "702" and replace with --906--.
In column 13, line 8, delete "116" and replace with --114--.
In column 13, line 8, delete "110" and replace with --106--.
In column 13, line 9, delete "112" and replace with --118--.
In column 13, line 10, delete "114" and replace with --104--.
In column 13, line 12, delete "100" and replace with --116--.
In column 13, line 12, delete "116" and replace with --114--.
In column 13, line 14, delete "110" and replace with --106--.
In column 13, line 14, delete "114" and replace with --104--.
In column 13, line 15, delete "112" and replace with --118--.
In column 13, line 18, delete "104" and replace with --112--.
In column 13, line 18, delete "106" and replace with --102--.
In column 13, line 20, delete "116" and replace with --114--.
In column 13, line 22, delete "100" and replace with --116--.
In column 13, line 23, delete "112" and replace with --118--.
In column 13, line 24, delete "116" and replace with --114--.
In column 13, line 25, delete "112" and replace with --118--.
In column 13, line 26, delete "206" and replace with --802--.
In column 13, line 27, delete "110" and replace with --106--.
In column 13, line 28, delete "104" and replace with --112--.
In column 13, line 29, delete "114" and replace with --104--.
In column 13, line 29, delete "104" and replace with --112--.

CERTIFICATE OF CORRECTION (continued)
U.S. Pat. No. 8,082,486 B1

In column 13, line 30, delete "106" and replace with --102--.
In column 13, line 30, delete "206" and replace with --802--.
In column 13, line 32, delete each occurrence of "110" and replace each occurrence with --106--.
In column 13, line 33, delete "114" and replace with --104--.
In column 13, line 35, delete "tracking module 208" and replace with --leveraged content server 116--.
In column 13, line 37, delete "112" and replace with --118--.
In column 13, line 38, delete "110" and replace with --106--.
In column 13, line 39, delete "112" and replace with --118--.
In column 13, line 40, delete "100" and replace with --116--.
In column 13, line 41, delete "110" and replace with --106--.
In column 13, line 42, delete "112" and replace with --118--.
In column 13, line 45, delete "110" and replace with --106--.
In column 13, line 45, delete "114" and replace with --104--.
In column 13, line 47, delete "110" and replace with --106--.
In column 13, line 51, delete "210" and replace with --808--.
In column 13, line 52, delete "208" and replace with --206--.
In column 13, line 53, delete "210" and replace with --808--.
In column 13, line 54, delete "210" and replace with --808--.
In column 13, line 56, delete "116" and replace with --114--.
In column 13, line 57, delete "112" and replace with --118--.
In column 13, line 58, delete "110" and replace with --106--.
In column 13, line 60, delete "210" and replace with --808--.
In column 13, line 61, delete "114" and replace with --104--.
In column 13, line 61, delete "110" and replace with --106--.
In column 13, line 62, delete "112" and replace with --118--.
In column 13, line 63, delete "110" and replace with --106--.
In column 13, line 65, delete "110" and replace with --106--.
In column 14, line 3, delete "100" and replace with --116--.
In column 14, line 4, delete "112" and replace with --118--.
In column 14, line 9, delete "100" and replace with --116--.
In column 14, line 10, delete "114" and replace with --104--.
In column 14, line 10, delete "112" and replace with --118--.
In column 14, line 12, delete "112" and replace with --118--.
In column 14, line 14, delete "112" and replace with --118--.
In column 14, line 16, delete "110" and replace with --106--.
In column 14, line 18, delete "110" and replace with --106--.
In column 14, line 18, delete "114" and replace with --104--.
In column 14, line 20, delete "110" and replace with --106--.
In column 14, line 21, delete "114" and replace with --104--.
In column 14, line 22, delete "104" and replace with --112--.
In column 14, line 23, delete "114" and replace with --104--.
In column 14, line 24, delete "110" and replace with --106--.
In column 14, line 24, delete "116" and replace with --114--.
In column 14, line 25, delete "110" and replace with --106--.

CERTIFICATE OF CORRECTION (continued)
U.S. Pat. No. 8,082,486 B1

In column 14, line 26, delete "112" and replace with --118--.
In column 14, line 28, delete "702" and replace with --906--.
In column 14, line 29, delete "112" and replace with --118--.
In column 14, line 31, delete "116" and replace with --114--.
In column 14, line 32, delete "112" and replace with --118--.
In column 14, line 32, delete "110" and replace with --106--.
In column 14, line 33, delete "114" and replace with --104--.
In column 14, line 34, delete "110" and replace with --106--.
In column 14, line 35, delete "116" and replace with --114--.
In column 14, line 36, delete "112" and replace with --118--.
In column 14, line 37, delete "110" and replace with --106--.
In column 14, line 38, delete "116" and replace with --114--.
In column 14, line 38, delete "702" and replace with --906--.
In column 14, line 40, delete "114" and replace with --104--.
In column 14, line 40, delete "110" and replace with --106--.
In column 14, line 41, delete "116" and replace with --114--.
In column 14, line 42, delete "112" and replace with --118--.
In column 14, line 43, delete "114" and replace with --104--.
In column 14, line 43, delete "110" and replace with --106--.
In column 14, line 44, delete "116" and replace with --114--.
In column 14, line 45, delete "112" and replace with --118--.
In column 14, line 48, delete "100" and replace with --116--.
In column 14, line 49, delete "110" and replace with --106--.
In column 14, line 49, delete "106" and replace with --102--.
In column 14, line 50, delete "110" and replace with --106--.
In column 14, line 51, delete "114" and replace with --104--.
In column 14, line 55, delete "110" and replace with --106--.
In column 14, line 56, delete "114" and replace with --104--.
In column 14, line 60, delete "110" and replace with --106--.
In column 14, line 61, delete "214" and replace with --204--.
In column 14, line 63, delete "110" and replace with --106--.
In column 14, line 63, delete "114" and replace with --104--.
In column 14, line 64, delete "104" and replace with --112--.
In column 14, line 65, delete "100" and replace with --116--.
In column 14, line 65, delete "116" and replace with --114--.
In column 14, line 66, delete "214" and replace with --204--.
In column 14, line 67, delete "110" and replace with --106--.
In column 15, line 2, delete "114" and replace with --104--.
In column 15, line 5, delete "110" and replace with --106--.
In column 15, line 6, delete "116" and replace with --114--.
In column 15, line 7, delete "106" and replace with --102--.
In column 15, line 10, delete "110" and replace with --106--.
In column 15, line 10, delete "116" and replace with --114--.
In column 15, line 12, delete "110" and replace with --106--.
In column 15, line 13, delete "112" and replace with --118--.

CERTIFICATE OF CORRECTION (continued)
U.S. Pat. No. 8,082,486 B1

In column 15, line 18, delete "100" and replace with --116--.
In column 15, line 19, delete "110" and replace with --106--.
In column 15, line 19, delete "112" and replace with --118--.
In column 15, line 21, delete "104" and replace with --112--.
In column 15, line 21, delete "106" and replace with --102--.
In column 15, line 23, delete "116" and replace with --114--.
In column 15, line 25, delete "100" and replace with --116--.
In column 15, line 26, delete "112" and replace with --118--.
In column 15, line 27, delete "116" and replace with --114--.
In column 15, line 28, delete "112" and replace with --118--.
In column 15, line 29, delete "116" and replace with --114--.
In column 15, line 30, delete "112" and replace with --118--.
In column 15, line 31, delete "110" and replace with --106--.
In column 15, line 32, delete "114" and replace with --104--.
In column 15, line 33, delete "110" and replace with --106--.
In column 15, line 33, delete "116" and replace with --114--.
In column 15, line 35, delete "112" and replace with --118--.
In column 15, line 35, delete "110" and replace with --106--.
In column 15, line 36, delete "116" and replace with --114--.
In column 15, line 37, delete "702" and replace with --906--.
In column 15, line 40, delete "100" and replace with --116--.
In column 15, line 41, delete "112" and replace with --118--.
In column 15, line 47, delete "110" and replace with --106--.
In column 15, line 47, delete "114" and replace with --104--.
In column 15, line 48, delete "112" and replace with --118--.
In column 15, line 50, delete "112" and replace with --118--.
In column 15, line 51, delete "112" and replace with --118--.
In column 15, line 54, delete "110" and replace with --106--.
In column 15, line 55, delete "110" and replace with --106--.
In column 15, line 56, delete "114" and replace with --104--.
In column 15, line 60, delete "110" and replace with --106--.
In column 15, line 61, delete "110" and replace with --106--.
In column 15, line 61, delete "114" and replace with --104--.
In column 15, line 62, delete "116" and replace with --114--.
In column 15, line 62, delete "110" and replace with --106--.
In column 15, line 63, delete "114" and replace with --104--.
In column 15, line 64, delete "100" and replace with --116--.
In column 16, line 3, delete "100" and replace with --116--.
In column 16, line 4, delete "110" and replace with --106--.
In column 16, line 5, delete "110" and replace with --106--.
In column 16, line 6, delete "106" and replace with --102--.
In column 16, line 6, delete "114" and replace with --104--.
In column 16, line 7, delete "100" and replace with --116--.
In column 16, line 8, delete "110" and replace with --106--.
In column 16, line 9, delete "114" and replace with --104--.

CERTIFICATE OF CORRECTION (continued)
U.S. Pat. No. 8,082,486 B1

In column 16, line 13, delete "110" and replace with --106--.
In column 16, line 14, delete "116" and replace with --114--.
In column 16, line 17, delete "110" and replace with --106--.
In column 16, line 17, delete "114" and replace with --104--.
In column 16, line 19, delete "110" and replace with --106--.
In column 16, line 20, delete "114" and replace with --104--.
In column 16, line 22, delete "116" and replace with --114--.
In column 16, line 23, delete "110" and replace with --106--.
In column 16, line 23, delete "114" and replace with --104--.
In column 16, line 39, delete "206" and replace with --204--.
In column 16, line 40, delete "210" and replace with --208--.
In column 17, line 25, delete "110" and replace with --106--.
In column 17, line 28, delete "110" and replace with --106--.
In column 17, line 33, delete "106" and replace with --102--.